United States Patent
Seo et al.

(10) Patent No.: US 10,306,619 B2
(45) Date of Patent: *May 28, 2019

(54) METHOD AND APPARATUS FOR CHANNEL ESTIMATION FOR RADIO LINK BETWEEN A BASE STATION AND A RELAY STATION

(71) Applicant: LG ELECTRONICS INC., Seoul (KR)

(72) Inventors: Han Byul Seo, Anyang-si (KR); Hak Seong Kim, Anyang-si (KR); Ki Jun Kim, Anyang-si (KR); Byoung Hoon Kim, Anyang-si (KR); Dae Won Lee, Anyang-si (KR)

(73) Assignee: LG ELECTRONICS INC., Seoul (KR)

(*) Notice: Subject to any disclaimer, the term of this patent is extended or adjusted under 35 U.S.C. 154(b) by 11 days.

This patent is subject to a terminal disclaimer.

(21) Appl. No.: 15/658,094

(22) Filed: Jul. 24, 2017

(65) Prior Publication Data

US 2017/0325203 A1 Nov. 9, 2017

Related U.S. Application Data

(63) Continuation of application No. 15/237,280, filed on Aug. 15, 2016, now Pat. No. 9,730,210, which is a
(Continued)

(51) Int. Cl.
*H04W 4/00* (2018.01)
*H04W 72/04* (2009.01)
(Continued)

(52) U.S. Cl.
CPC .......... *H04W 72/042* (2013.01); *H04B 7/155* (2013.01); *H04L 5/0023* (2013.01);
(Continued)

(58) Field of Classification Search
CPC . H04W 72/042; H04W 72/04; H04W 84/047; H04L 5/0032; H04L 5/0023;
(Continued)

(56) References Cited

U.S. PATENT DOCUMENTS

| | | |
|---|---|---|
| 9,439,180 B2 | 9/2016 | Seo et al. |
| 2010/0080139 A1 | 4/2010 | Palanki et al. |

(Continued)

FOREIGN PATENT DOCUMENTS

| | | |
|---|---|---|
| CN | 101617489 A | 12/2009 |
| CN | 101669304 A | 3/2010 |
| WO | WO 2010/032973 A2 | 3/2010 |

OTHER PUBLICATIONS

Catt, "Design of Relay Reference Signal on Backhaul in LTE-A," 3GPP TSG RAN WG1 Meeting #60bis, Agenda Item 6.6.1.2, R1-101779, Apr. 12-16, 2010, Beijing, China, 9 pages.

(Continued)

*Primary Examiner* — Clemence S Han
(74) *Attorney, Agent, or Firm* — Birch, Stewart, Kolasch & Birch, LLP

(57) ABSTRACT

A method is provided for receiving a downlink signal at a downlink reception entity in a wireless communication system. Downlink control information is received by demodulating a Physical Downlink Control Channel (PDCCH) in a first resource block (RB) pair within an RB bundle by using a first Demodulation Reference Signal (DMRS). Downlink data is received by demodulating a Physical Downlink Shared Channel (PDSCH) in one or more second RB pairs scheduled by the downlink control information within the RB bundle by using a second DMRS based on an assumption that a same precoder is applied to the scheduled one or more second RB pairs.

6 Claims, 24 Drawing Sheets

Related U.S. Application Data continuation of application No. 14/246,883, filed on Apr. 7, 2014, now Pat. No. 9,439,180, which is a continuation of application No. 13/640,700, filed as application No. PCT/KR2011/002941 on Apr. 22, 2011, now Pat. No. 8,730,903.

(60) Provisional application No. 61/414,881, filed on Nov. 17, 2010, provisional application No. 61/405,230, filed on Oct. 21, 2010, provisional application No. 61/327,067, filed on Apr. 22, 2010, provisional application No. 61/327,068, filed on Apr. 22, 2010.

(51) Int. Cl.
  *H04B 7/155* (2006.01)
  *H04L 5/00* (2006.01)
  *H04W 84/04* (2009.01)

(52) U.S. Cl.
  CPC .......... *H04L 5/0032* (2013.01); *H04L 5/0044* (2013.01); *H04L 5/0048* (2013.01); *H04L 5/0051* (2013.01); *H04L 5/0082* (2013.01); *H04L 5/0094* (2013.01); *H04L 5/0039* (2013.01); *H04L 5/0053* (2013.01); *H04L 5/0069* (2013.01); *H04W 72/04* (2013.01); *H04W 84/047* (2013.01)

(58) Field of Classification Search
  CPC ... H04L 5/0048; H04L 5/0044; H04L 5/0051; H04L 5/0082; H04L 5/0094; H04L 5/0039; H04L 5/0053; H04L 5/0069; H04B 7/155
  See application file for complete search history.

(56) References Cited

U.S. PATENT DOCUMENTS

| | | | |
|---|---|---|---|
| 2010/0080166 A1 | 4/2010 | Palanki et al. | |
| 2010/0091678 A1 | 4/2010 | Chen et al. | |
| 2011/0141987 A1* | 6/2011 | Nam | H04L 1/0003 370/329 |
| 2011/0255505 A1* | 10/2011 | Liu | H04L 5/0007 370/330 |
| 2012/0163335 A1 | 6/2012 | Chung et al. | |
| 2012/0213147 A1 | 8/2012 | Noh et al. | |
| 2012/0287901 A1 | 11/2012 | Ahn et al. | |
| 2013/0021991 A1 | 1/2013 | Ko et al. | |
| 2013/0195034 A1 | 8/2013 | Noh et al. | |
| 2013/0286880 A1 | 10/2013 | Lee et al. | |
| 2013/0294372 A1 | 11/2013 | Ishii et al. | |
| 2013/0301554 A1 | 11/2013 | Nam et al. | |
| 2014/0016599 A1 | 1/2014 | Kawamura et al. | |

OTHER PUBLICATIONS

NEC Group, "Reference Signals for Demodulating R-PDCCH Channel," TSG-RAN WG1#60, Agenda Item 7.5.1.2, R1-101322, Feb. 22-26, 2010, San Francisco, California, USA, 6 pages.

Panasonic, "R-PDCCH Placement," 3GPP TSG RAN WG1 Meeting #59bis, Agenda Item 7.5.1 Backhaul Design for Type 1 Relays, R1-100382, Jan. 18-22, 2010, Valencia, Spain, 4 pages.

Qualcomm Incorporated, "DM-RS for R-PDCCH," 3GPP TSG-RAN WG1 #59bis, Agenda Item 7.5.1, R1-100799, Jan. 18-22, 2010, Valencia, Spain, 3 pages.

LG Electronics, "Consideration on Multi-RB Channel Interpolation," 3GPP TSG RAN WG1 Meeting #59, R1-094793, Jeju, South Korea, Nov. 9-13, 2009, 5 pages, XP050389189.

Samsung, "Discussion on RB Bundling for DM-RS," 3GPP TSG RAN WG1 Meeting #60bis, R1-102187, Beijing, China, Apr. 12-16, 2010 (Server date Apr. 6, 2010; Downloaded by EPO on Jun. 12, 2010), 5 pages, XP050419467.

ZTE, "Considerations on Demodulation Reference Signal in Backhaul Downlink," TSG-RAN WG1 #58, R1-093204, Shenzhen, CN, Aug. 24-28, 2009, pp. 1-6, XP050351557.

ZTE, "Reference Signals for R-PDCCH Demodulation," TSG-RAN WG1 #60, R1-100974, San Francisco, USA, Feb. 22-26, 2010 (Server date Feb. 16, 2010; Downloaded by EPO on Jun. 12, 2010), pp. 1-7, XP050418556.

* cited by examiner (a)

(b)

(a)

(b)

(a)

(b)

☐ : Control Channel region
▨ : DMRS (CDM group 1)
▨ : DMRS (CDM group 2)
◨ : CRS
☐ : Data region

METHOD AND APPARATUS FOR CHANNEL ESTIMATION FOR RADIO LINK BETWEEN A BASE STATION AND A RELAY STATION

CROSS-REFERENCE TO RELATED APPLICATIONS

This application is a Continuation of U.S. patent application Ser. No. 15/237,280, filed on Aug. 15, 2016 (now U.S. Pat. No. 9,730,210 issued on Aug. 8, 2017), which is a Continuation of U.S. patent application Ser. No. 14/246,883, filed on Apr. 7, 2014 (now U.S. Pat. No. 9,439,180 issued on Sep. 6, 2016), which is a Continuation of U.S. patent application Ser. No. 13/640,700, filed on Oct. 11, 2012 (now U.S. Pat. No. 8,730,903 issued on May 20, 2014), which was filed as the National Phase of PCT/KR2011/002941 filed on Apr. 22, 2011, which claims priority under 35 U.S.C. 119(e) to U.S. Provisional Application Nos. 61/414,881 filed on Nov. 17, 2010, 61/405,230 filed on Oct. 21, 2010, 61/327,067 filed on Apr. 22, 2010, and 61/327,068 filed on Apr. 22, 2010. The contents of all these applications are hereby expressly incorporated by reference into the present application.

BACKGROUND OF THE INVENTION

The present invention relates to a radio communication system, and more particularly, to a method and apparatus for channel estimation for radio link between a base station and a relay station in a radio communication system supporting multiple carriers.

FIG. 1 shows a relay node (RN) 120 and User Equipments (UEs) 131 and 132 located in an area of one base station (or eNodeB or eNB) 110 in a radio communication system 100. The RN 120 may transmit data received from the eNodeB 110 to the UE 132 located in an RN area and transmit data received from the UE 132 located in the RN area to the eNodeB 110. In addition, the RN 120 may expand a high data rate area, improve communication quality in a cell edge, and support provision of communication in a building or in an area other than a base station service area. In FIG. 1, the UE 131 (hereinafter, referred to as a macro-UE or M-UE) which directly receives a service from the eNodeB and the UE 132 (hereinafter, referred to as a relay-UE or R-UE) which receives a service from the RN 120 are shown.

A wireless link between the eNodeB and the RN is called a backhaul link. A link from the eNodeB to the RN is called a backhaul downlink and a link from the RN to the eNodeB is called a backhaul uplink. In addition, a wireless link between the RN and the UE is called an access link. A link from the RN to the UE is called an access downlink and a link from the UE to the RN is called an access uplink.

SUMMARY OF THE INVENTION

In order for a relay node (RN) to forward communication between an eNB (or BS) and a user equipment (UE), it is necessary to properly discriminate between resources used for communication on a backhaul link between the eNB and the UE and other resources used for communication on an access link between the UE and the RN. This is called resource partitioning. In the case of the resource partitioning, the backhaul link between the eNB and the RN may be configured different from a wireless link between the eNB and the UE for use in the legacy system not including the RN. Therefore, assuming that a conventional power allocation scheme or a conventional channel estimation scheme is applied to the backhaul link without any change, unexpected performance deterioration or incorrect transmission/reception may occur. As such, it is necessary to develop and propose a new power allocation scheme, a new channel estimation scheme, and the like for a backhaul link.

An object of the present invention devised to solve the problem lies in providing a method for allocating power, a channel estimation method, and associated methods for configuring physical resources for a backhaul link between an eNB and an RN. Another object of the present invention devised to solve the problem lies in providing a channel estimation method for a Resource Block (RB) pair to which downlink (DL) scheduling control information for the RN is transmitted in consideration of precoding and/or power allocation applied to DL resources when resources for downlink from the eNB to the RN are allocated.

It will be appreciated by persons skilled in the art that the objects that can be achieved with the present invention are not limited to what has been particularly described hereinabove and the above and other objects that the present invention can achieve will be more clearly understood from the following detailed description taken in conjunction with the accompanying drawings.

The object of the present invention can be achieved by providing a method for receiving a downlink signal at a relay node (RN) in a wireless communication system, the method comprising receiving downlink control information by demodulating a Relay-Physical Downlink Control Channel (R-PDCCH) of a first RB pair based on a downlink channel estimated by a Demodulation Reference Signal (DMRS) in the first resource block (RB) pair; and receiving downlink data by demodulating a Physical Downlink Shared Channel (PDSCH) of the one or more RB pairs contiguous to the first RB pair based on a downlink channel estimated by a DMRS in the one or more RB pairs, wherein, if the PDSCH is assigned to the first RB pair, the downlink channel is estimated on the assumption that the same precoder is applied to one resource block (RB) bundle including the first RB pair and the one or more RB pairs.

In another aspect of the present invention, provided herein is a method for performing downlink transmission from a base station (BS) to a relay node (RN) in a wireless communication system, the method comprising transmitting, in a first resource block (RB) pair, downlink control information through a Relay-Physical Downlink Control Channel (R-PDCCH) and a Demodulation Reference Signal (DMRS) for estimating a downlink channel used for demodulating the R-PDCCH; and transmitting, in one or more RB pairs contiguous to the first RB pair, downlink data through a Physical Downlink Shared Channel (PDSCH) and a DMRS used for estimating a downlink channel for demodulating the PDSCH, wherein, if the PDSCH is assigned to the first RB pair, the same precoder is applied to one resource block (RB) bundle including the first RB pair and the one or more RB pairs by the BS.

In still another aspect of the present invention, provided herein is a relay node for performing downlink reception comprising a first reception module for receiving a downlink signal from a base station; a first transmission module for transmitting an uplink signal to the base station; a second reception module for receiving an uplink signal from a user equipment; a second transmission module for transmitting a downlink signal to the user equipment; and a processor for controlling the relay node including the first and second reception modules and the first and second transmission modules, wherein the processor is configured to receive, through the first reception module, downlink control information by demodulating a Relay-Physical Downlink Control Channel (R-PDCCH) of a first RB pair based on a downlink channel estimated by a Demodulation Reference Signal (DMRS) in the first resource block (RB) pair; and to receive, through the first reception module, the downlink data by demodulating a Physical Downlink Shared Channel (PDSCH) of the one or more RB pairs contiguous to the first RB pair based on a downlink channel estimated by a DMRS in the one or more RB pairs, wherein, if the PDSCH is assigned to the first RB pair, the downlink channel is estimated on the assumption that the same precoder is applied to one resource block (RB) bundle including the first RB pair and the one or more RB pairs.

In still another aspect of the present invention, provided herein is a base station for performing downlink transmission to a relay node in a wireless communication system, the base station comprising a reception module for receiving an uplink signal from the relay node; a transmission module for transmitting a downlink signal to the relay node; and a processor for controlling the base station including the reception module and the transmission module, wherein the processor is configured to transmit, through the transmission module, in a first resource block (RB) pair, downlink control information through a Relay-Physical Downlink Control Channel (R-PDCCH) and a Demodulation Reference Signal (DMRS) for estimating a downlink channel used for demodulating the R-PDCCH; and to transmit, through the transmission module, in one or more RB pairs contiguous to the first RB pair, downlink data through a Physical Downlink Shared Channel (PDSCH) and a DMRS used for estimating a downlink channel for demodulating the PDSCH, wherein, if the PDSCH is assigned to the first RB pair, the same precoder is applied to one resource block (RB) bundle including the first RB pair and the one or more RB pairs by the base station.

The following matters are applicable to the embodiments of the present invention.

In case that the PDSCH is assigned to the first RB pair, the R-PDCCH is assigned to a first slot of the first RB pair, and the PDSCH is assigned to a second slot of the first RB pair.

In case that the PDSCH is not assigned to the first RB pair, the downlink channel is estimated on the assumption that the same precoder is applied to one RB bundle including the one or more RB pairs other than the first RB pair. Further, in case that the PDSCH is not assigned to the first RB pair, the R-PDCCH is assigned to a first slot of the first RB pair, and an R-PDCCH transmitting uplink grant control information or a null signal is transmitted to a second slot of the first RB pair.

The downlink channel is estimated using all DMRSs transmitted in the one RB bundle.

The one RB bundle includes RB pairs transmitted in one subframe.

The one RB bundle including the first RB pair is applied to channel estimation for each of one or more downlink layers used for transmitting the R-PDCCH.

The one RB bundle including the first RB pair is applied to downlink channel estimation for the case that a number of downlink layers assumed for decoding R-PDCCH is three or more.

One RB pair includes two slots, and, if a DMRS for a specific antenna port is transmitted in one of the two slots of the one RB pair, the DMRS for the specific antenna port is transmitted in the other one of the two slots of the one RB pair.

Downlink grant control information is transmitted through the R-PDCCH.

It is to be understood that both the foregoing general description and the following detailed description of the present invention are exemplary and explanatory and are intended to provide further explanation of the invention as claimed.

The embodiments of the present invention can provide a method for allocating power, a channel estimation method, and associated methods for establishing physical resources for a backhaul link between an eNB and an RN, such that power allocation and channel estimation for a backhaul link can be correctly and efficiently performed. In addition, when resources for DL from the eNB to the RN are allocated, the present invention can provide a channel estimation method for a Resource Block (RB) pair to which DL scheduling control information for the RN is transmitted in consideration of precoding and/or power allocation applied to DL resources.

It is to be understood that the advantages that can be obtained by the present invention are not limited to the aforementioned advantages and other advantages which are not mentioned will be apparent from the following description to those of an ordinary skill in the art to which the present invention pertains.

BRIEF DESCRIPTION OF THE DRAWINGS

The accompanying drawings, which are included to provide a further understanding of the invention, illustrate embodiments of the invention and together with the description serve to explain the principle of the invention.

In the drawings.

DETAILED DESCRIPTION OF THE INVENTION

Figure 1:
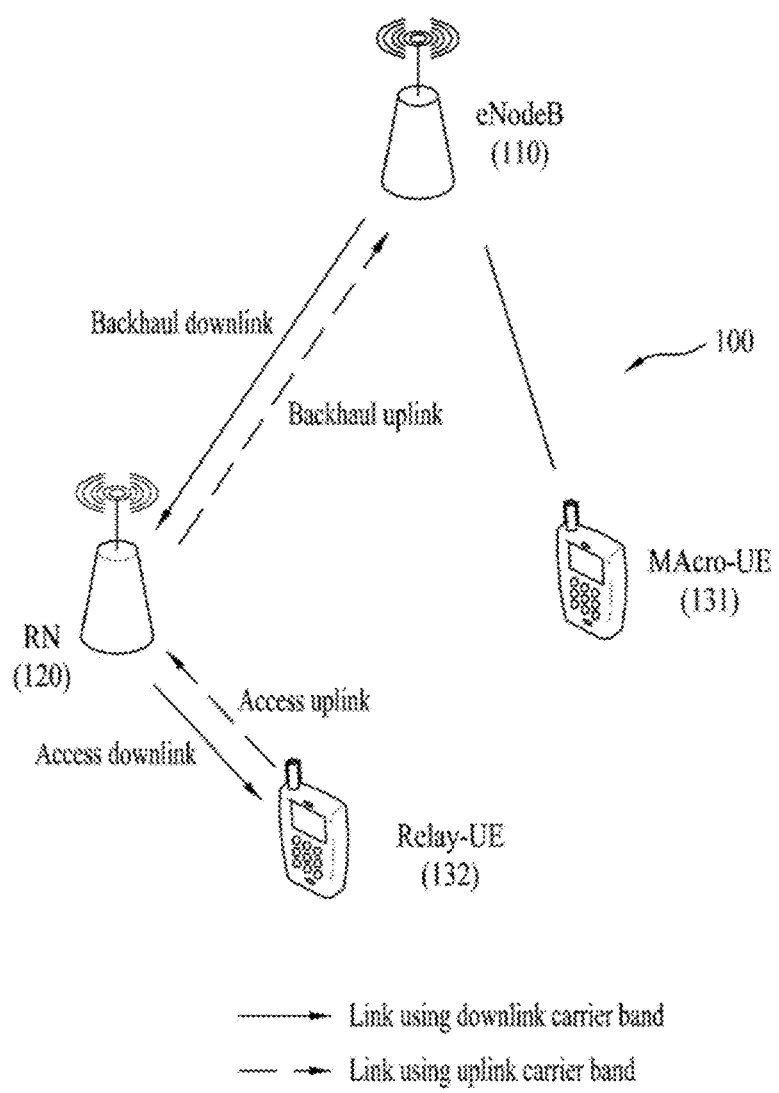
FIG. 1 is a diagram illustrating a wireless communication system including an eNB, an RN and a UE.

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary.

The embodiments of the present invention are disclosed on the basis of a data communication relationship between a base station and a terminal. In this case, the base station is used as a terminal node of a network via which the base station can directly communicate with the terminal. Specific operations to be conducted by the base station in the present invention may also be conducted by an upper node of the base station as necessary.

In other words, it will be obvious to those skilled in the art that various operations for enabling the base station to communicate with the terminal in a network composed of several network nodes including the base station will be conducted by the base station or other network nodes other than the base station. The term "Base Station (BS)" may be replaced with a fixed station, Node-B, eNode-B (eNB), or an access point as necessary. The term "relay" may be replaced with a Relay Node (RN) or a Relay Station (RS). The term "terminal" may also be replaced with a User Equipment (UE), a Mobile Station (MS), a Mobile Subscriber Station (MSS) or a Subscriber Station (SS) as necessary.

It should be noted that specific terms disclosed in the present invention are proposed for the convenience of description and better understanding of the present invention, and the use of these specific terms may be changed to another format within the technical scope of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a 3$^{rd}$ Generation Project Partnership (3GPP) system, a 3GPP Long Term Evolution (LTE) system, and a 3GPP2 system. In particular, the steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. The CDMA may be embodied with wireless (or radio) technology such as UTRA (Universal Terrestrial Radio Access) or CDMA2000. The TDMA may be embodied with wireless (or radio) technology such as GSM (Global System for Mobile communications)/GPRS (General Packet Radio Service)/EDGE (Enhanced Data Rates for GSM Evolution). The OFDMA may be embodied with wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). The UTRA is a part of the UMTS (Universal Mobile Telecommunications System). The 3GPP (3rd Generation Partnership Project) LTE (long term evolution) is a part of the E-UMTS (Evolved UMTS), which uses E-UTRA. The 3GPP LTE employs the OFDMA in downlink and employs the SC-FDMA in uplink. The LTE-Advanced (LTE-A) is an evolved version of the 3GPP LTE. WiMAX can be explained by an IEEE 802.16e (WirelessMAN-OFDMA Reference System) and an advanced IEEE 802.16m (WirelessMAN-OFDMA Advanced System). For clarity, the following description focuses on the 3GPP LTE and 3GPP LTE-A system. However, technical features of the present invention are not limited thereto.

Figure 2:
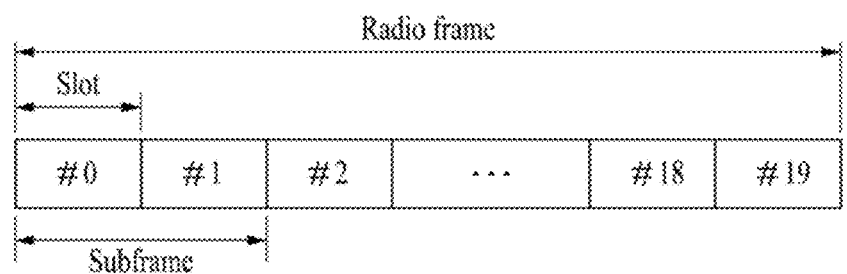
FIG. 2 is a diagram exemplarily shows a radio frame structure for use in a 3rd Generation Partnership Project Long Term Evolution (3GPP LTE) system.

FIG. 2 is a diagram showing the structure of a radio frame used in a 3$^{rd}$ Generation Partnership Project Long Term Evolution (3GPP LTE) system. One radio frame includes 10 subframes, and one subframe includes two slots in a time domain. A time for transmitting one subframe is defined in a Transmission Time Interval (TTI). For example, one subframe may have a length of 1 ms and one slot may have a length of 0.5 ms. One slot may include a plurality of OFDM symbols in a time domain. Since the 3GPP LTE system uses an OFDMA scheme in downlink, the OFDM symbol indicates one symbol period. One symbol may be called a SC-FDMA symbol or a symbol period in uplink. A Resource Block (RB) is a resource allocation unit and includes a plurality of consecutive carriers in one slot. The above structure of the radio frame is only exemplary. Accordingly, the number of subframes included in one radio frame, the number of slots included in one subframe or the number of OFDM symbols included in one slot may be changed in various manners.

Figure 3:
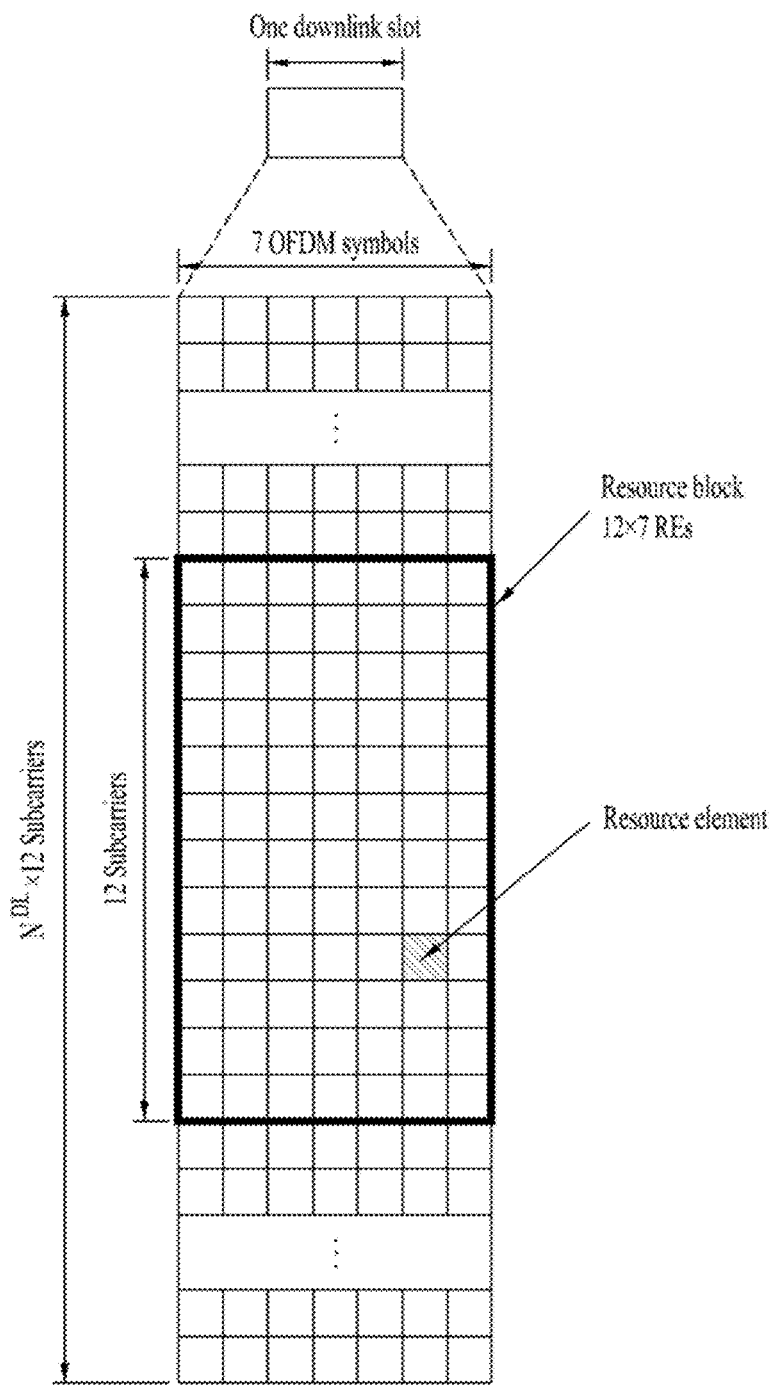
FIG. 3 is a diagram exemplarily shows a resource grid of a DL slot.

FIG. 3 is a diagram showing a resource grid in a downlink slot. Although one downlink slot includes seven OFDM symbols in a time domain and one RB includes 12 subcarriers in a frequency domain in the figure, the present invention is not limited thereto. For example, in case of a normal Cyclic Prefix (CP), one slot includes 7 OFDM symbols. However, in case of an extended CP, one slot includes 6 OFDM symbols. Each element on the resource grid is referred to as a resource element. One RB includes 12×7 resource elements. The number $N^{DL}$ of RBs included in the downlink slot is determined based on a downlink transmission bandwidth. The structure of the uplink slot may be equal to the structure of the downlink slot.

Figure 4:
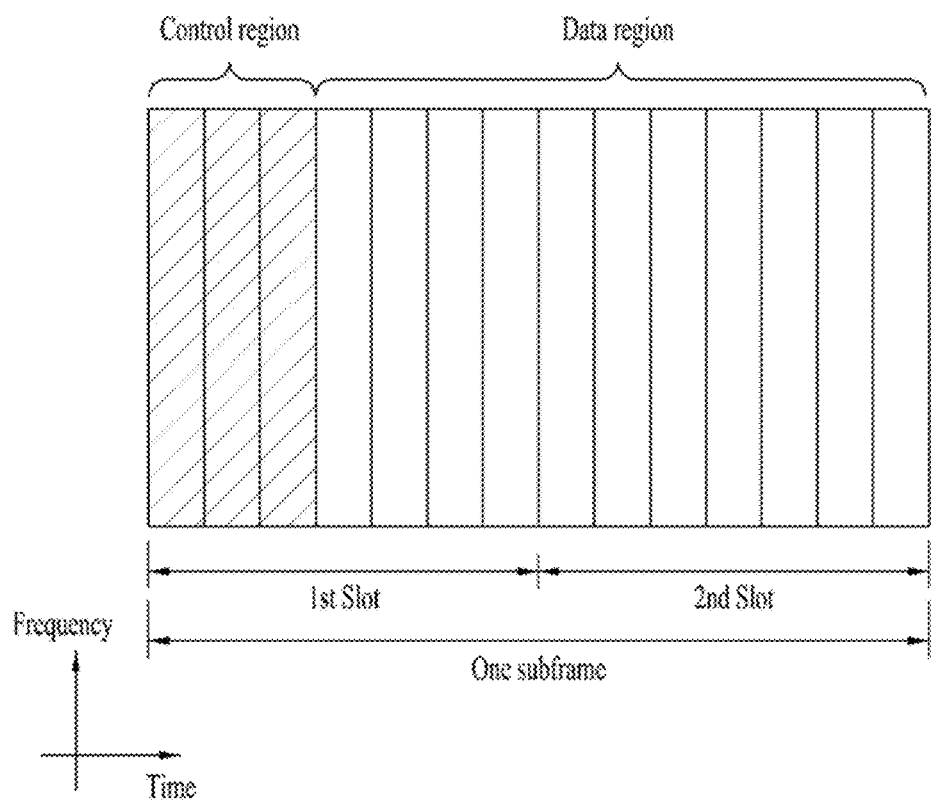
FIG. 4 is a diagram shows downlink (DL) subframe structure.

FIG. 4 is a diagram showing the structure of a downlink subframe. A maximum of three OFDM symbols of a front portion of a first slot within one subframe corresponds to a control region to which a control channel is allocated. The remaining OFDM symbols correspond to a data region to which a Physical Downlink Shared Channel (PDSCH) is allocated. Examples of the downlink control channels used in the 3GPP LTE system include, for example, a Physical Control Format Indicator Channel (PCFICH), a Physical Downlink Control Channel (PDCCH), a Physical Hybrid automatic repeat request Indicator Channel (PHICH), etc. The PCFICH is transmitted at a first OFDM symbol of a subframe, and includes information about the number of OFDM symbols used to transmit the control channel in the subframe. The PHICH includes a HARQ ACK/NACK signal as a response of uplink transmission. The control information transmitted through the PDCCH is referred to as Downlink Control Information (DCI). The DCI includes uplink or downlink scheduling information or an uplink transmit power control command for a certain UE group. The PDCCH may include resource allocation and transmission format of a Downlink Shared Channel (DL-SCH), resource allocation information of an Uplink Shared Channel (UL-SCH), paging information of a Paging Channel (PCH), system information on the DL-SCH, resource allocation of an higher layer control message such as a Random Access Response (RAR) transmitted on the PDSCH, a set of transmit power control commands for an individual UEs in a certain UE group, transmit power control information, activation of Voice over IP (VoIP), etc. A plurality of PDCCHs may be transmitted within the control region. The UE may monitor the plurality of PDCCHs. The PDCCH is transmitted on an aggregation of one or several consecutive control channel elements (CCEs). The CCE is a logical allocation unit used to provide the PDCCHs at a coding rate based on the state of a radio channel. The CCE corresponds to a plurality of resource element groups. The format of the PDCCH and the number of available bits are determined based on a correlation between the number of CCEs and the coding rate provided by the CCEs. The number of CCEs used for PDCCH transmission is referred to as a CCE aggregation level. In addition, the CCE aggregation level is a CCE unit for searching for PDCCH. The size of the CCE aggregation level is defined as the number of contiguous CCEs. For example, the CCE aggregation level may be 1, 2, 4 or 8.

The base station determines a PDCCH format according to a DCI to be transmitted to the UE, and attaches a Cyclic Redundancy Check (CRC) to control information. The CRC is masked with a Radio Network Temporary Identifier (RNTI) according to an owner or usage of the PDCCH. If the PDCCH is for a specific UE, a cell-RNTI (C-RNTI) of the UE may be masked to the CRC. Alternatively, if the PDCCH is for a paging message, a paging indicator identifier (P-RNTI) may be masked to the CRC. If the PDCCH is for system information (more specifically, a system information block (SIB)), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

Figure 5:
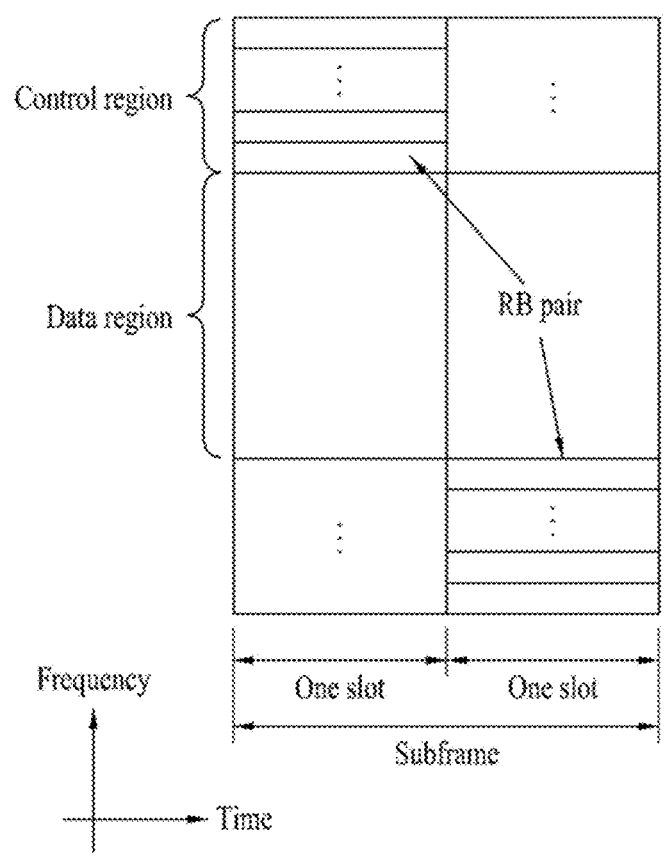
FIG. 5 is a diagram shows an uplink (UL) subframe structure.

FIG. 5 is a diagram showing the structure of an uplink frame. The uplink subframe may be divided into a control region and a data region in a frequency domain. A Physical Uplink Control Channel (PUCCH) including uplink control information is allocated to the control region. A Physical uplink Shared Channel (PUSCH) including user data is allocated to the data region. In order to maintain single carrier property, one UE does not simultaneously transmit the PUCCH and the PUSCH. The PUCCH for one UE is allocated to a RB pair in a subframe. RBs belonging to the RB pair occupy different subcarriers with respect to two slots. Thus, the RB pair allocated to the PUCCH is "frequency-hopped" at a slot boundary.

Modeling of Multi-Input Multi-Output (MIMO) System

Figure 6:
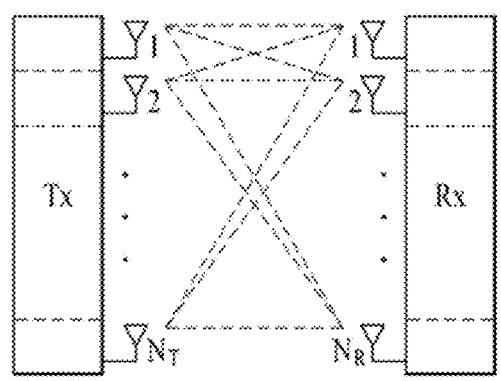
FIG. 6 is a diagram illustrating the configuration of a wireless communication system having multiple antennas.
Figure 6:
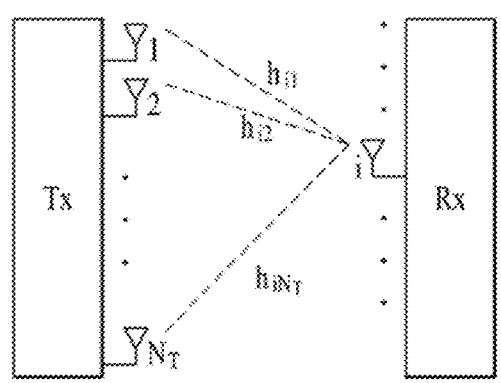

FIG. 6, including view (a) and view (b), is a diagram showing the configuration of a radio communication system having multiple antennas.

As shown in FIG. 6(a), if the number of transmission antennas is increased to $N_T$ and the number of reception antennas is increased to $N_R$, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate $R_0$ upon using a single antenna and a rate increase ratio $R_i$.

$$R_i = \min(N_T, N_R) \qquad \text{[Equation 1]}$$

For example, in an MIMO system using four transmission antennas and four reception antennas, it is possible to theoretically acquire a transfer rate which is four times that of a single antenna system. After the increase in the theoretical capacity of the MIMO system was proved in the mid-1990s, various technologies of substantially improving a data transfer rate have been actively developed up to now. In addition, several technologies are already applied to the various radio communication standards such as the third-generation mobile communication and the next-generation wireless local area network (LAN).

According to the researches into the MIMO antenna up to now, various researches such as researches into information theory related to the computation of the communication capacity of a MIMO antenna in various channel environments and multiple access environments, researches into the model and the measurement of the radio channels of the MIMO system, and researches into space-time signal processing technologies of improving transmission reliability and transmission rate have been actively conducted.

The communication method of the MIMO system will be described in more detail using mathematical modeling. In the above system, it is assumed that $N_T$ transmission antennas and $N_R$ reception antennas are present.

In transmitted signals, if the $N_T$ transmission antennas are present, the number of pieces of maximally transmittable information is $N_T$. The transmitted information may be expressed as follows.

$$s = [s_1, s_2, \ldots, s_{N_T}]^T \qquad \text{[Equation 2]}$$

The transmitted information $s_1, s_2, \ldots, s_{N_T}$ may have different transmit powers. If the respective transmit powers are $P_1, P_2, \ldots, P_{N_T}$, the transmitted information with adjusted powers may be expressed as follows.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

In addition, $\hat{S}$ may be expressed using a diagonal matrix P of the transmit powers as follows.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Consider that the $N_T$ actually transmitted signals $x_1$, $x_2, \ldots, x_{N_T}$ are configured by applying a weight matrix W to the information vector $\hat{S}$ with the adjusted transmit powers. The weight matrix W serves to appropriately distribute the transmitted information to each antenna according to a transport channel state, etc. $x_1, x_2, \ldots, x_{N_T}$ may be expressed by using the vector X as follows.

$$x = \begin{bmatrix} x_1 \\ x_2 \\ \vdots \\ x_i \\ \vdots \\ x_{N_T} \end{bmatrix} \quad \text{[Equation 5]}$$

$$= \begin{bmatrix} w_{11} & w_{12} & \ldots & w_{1N_T} \\ w_{21} & w_{22} & \ldots & w_{2N_T} \\ \vdots & & \ddots & \\ w_{i1} & w_{i2} & \ldots & w_{iN_T} \\ \vdots & & \ddots & \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s}$$

$$= WPs$$

where, $W_{ij}$ denotes a weight between an i-th transmission antenna and j-th information. W is also called a precoding matrix.

In received signals, if the $N_R$ reception antennas are present, respective received signals $y_1, y_2, \ldots, y_{N_R}$ of the antennas are expressed as follows.

$$y = [y_1, y_2, \ldots, y_{N_R}]^T \quad \text{[Equation 6]}$$

If channels are modeled in the MIMO radio communication system, the channels may be distinguished according to transmission/reception antenna indexes. A channel from the transmission antenna j to the reception antenna i is denoted by $h_{ij}$. In $h_{ij}$, it is noted that the indexes of the reception antennas precede the indexes of the transmission antennas in view of the order of indexes.

FIG. 6(b) is a diagram showing channels from the $N_T$ transmission antennas to the reception antenna i. The channels may be combined and expressed in the form of a vector and a matrix. In FIG. 6(b), the channels from the $N_T$ transmission antennas to the reception antenna i may be expressed as follows.

$$h_i^T = [h_{i1}, h_{i2}, \ldots, h_{iN_T}] \quad \text{[Equation 7]}$$

Accordingly, all the channels from the $N_T$ transmission antennas to the $N_R$ reception antennas may be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \quad \text{[Equation 8]}$$

An Additive White Gaussian Noise (AWGN) is added to the actual channels after a channel matrix H. The AWGN $n_1$, $n_2, \ldots, n_{N_R}$ added to the $N_T$ transmission antennas may be expressed as follows.

$$n = [n_1, n_2, \ldots, n_{N_R}]^T \quad \text{[Equation 9]}$$

Through the above-described mathematical modeling, the received signals may be expressed as follows.

$$y = \begin{bmatrix} y_1 \\ y_2 \\ \vdots \\ y_i \\ \vdots \\ y_{N_R} \end{bmatrix} \quad \text{[Equation 10]}$$

$$= \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix}$$

$$= Hx + n$$

The number of rows and columns of the channel matrix H indicating the channel state is determined by the number of transmission and reception antennas. The number of rows of the channel matrix H is equal to the number $N_R$ of reception antennas and the number of columns thereof is equal to the number $N_T$ of transmission antennas. That is, the channel matrix H is an $N_R \times N_T$ matrix.

The rank of the matrix is defined by the smaller of the number of rows or columns, which is independent from each other. Accordingly, the rank of the matrix is not greater than the number of rows or columns. The rank rank(H) of the channel matrix H is restricted as follows.

$$\text{rank}(H) \leq \min(N_T, N_R) \quad \text{[Equation 11]}$$

When the matrix is subjected to Eigen value decomposition, the rank may be defined by the number of Eigen values excluding 0. Similarly, when the matrix is subjected to singular value decomposition, the rank may be defined by the number of singular values excluding 0. Accordingly, the physical meaning of the rank in the channel matrix may be a maximum number of different transmittable information in a given channel.

Reference Signal (RS)

In a radio communication system, since packets are transmitted through a radio channel, a signal may be distorted during transmission. In order to enable a reception side to correctly receive the distorted signal, distortion of the received signal should be corrected using channel information. In order to detect the channel information, a method of transmitting a signal, of which both the transmission side and the reception side are aware, and detecting channel information using a distortion degree when the signal is received through a channel is mainly used. The above signal is referred to as a pilot signal or a reference signal (RS).

When transmitting and receiving data using multiple antennas, the channel states between the transmission antennas and the reception antennas should be detected in order to correctly receive the signal. Accordingly, each transmission antenna has an individual RS.

A downlink RS includes a Common RS (CRS) shared among all UEs in a cell and a Dedicated RS (DRS) for only a specific-UE. It is possible to provide information for channel estimation and demodulation using such RSs.

The reception side (UE) estimates the channel state from the CRS and feeds back an indicator associated with channel quality, such as a Channel Quality Indicator (CQI), a Precoding Matrix Index (PMI) and/or a Rank Indicator (RI), to the transmission side (eNodeB). The CRS may be also called a cell-specific RS. Alternatively, an RS associated with the feedback of Channel State Information (CSI) such as CQI/PMI/RI may be separately defined as a CSI-RS.

The DRS may be transmitted through REs if data demodulation on a PDSCH is necessary. The UE may receive the presence/absence of the DRS from a higher layer and receive information indicating that the DRS is valid only when the PDSCH is mapped. The DRS may be also called a UE-specific RS or a Demodulation RS (DMRS).

Figure 7:
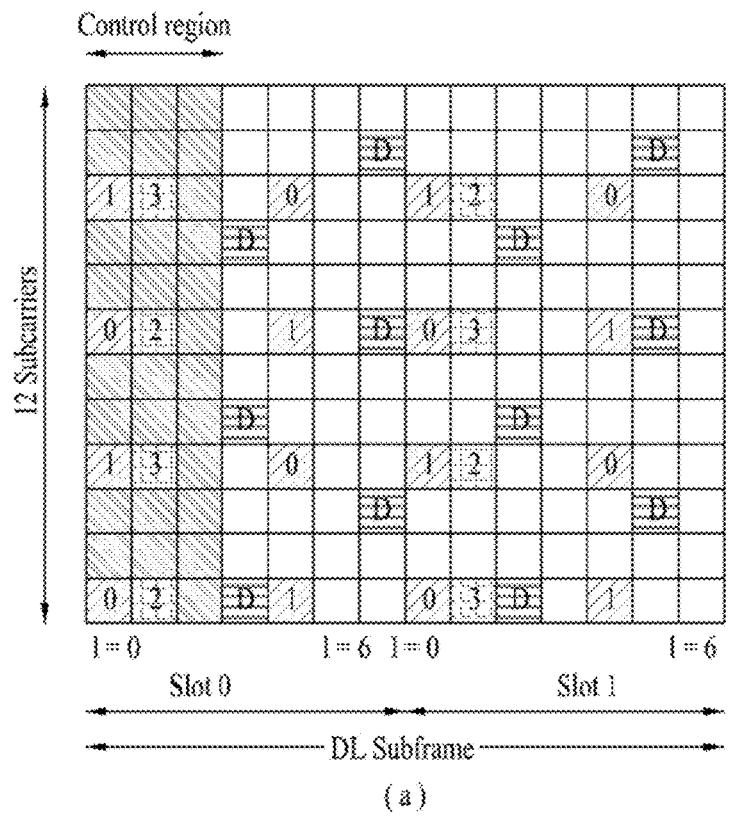
FIG. 7 is a diagram shows a DL reference signal pattern defined in the 3GPP LTE system.
Figure 7:
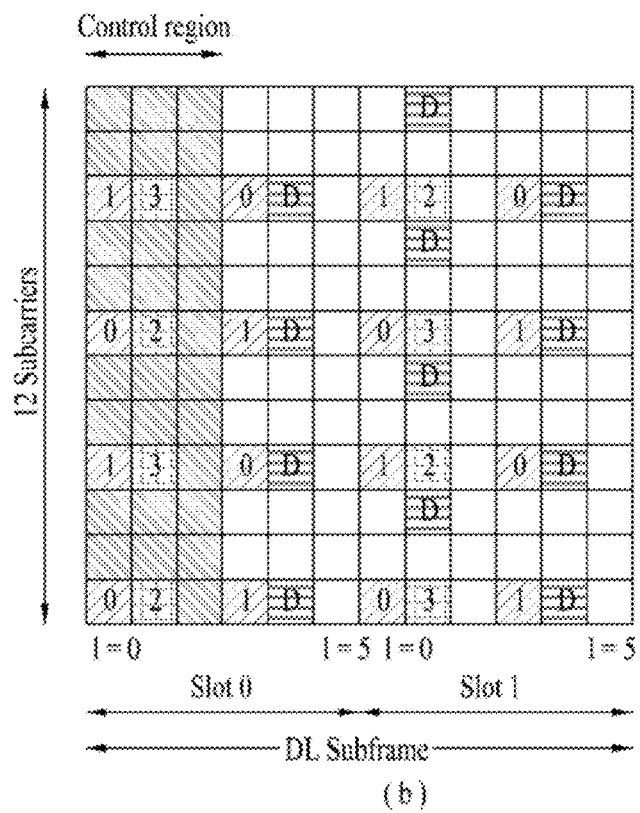

FIG. 7, including view (a) and view (b), is a diagram showing a pattern of CRSs and DRSs mapped on a downlink RB pair defined in the existing 3GPP LTE system (e.g., Release-8). The downlink RB pair as a mapping unit of the RSs may be expressed in units of one subframe on a time domain×12 subcarriers on a frequency domain. That is, on the time axis, one RB pair has a length of 14 OFDM symbols in case of the normal CP (FIG. 7(a)) and has a length of 12 OFDM symbols in case of the extended CP (FIG. 7(b)).

FIG. 7 shows the locations of the RSs on the RB pair in the system in which the eNodeB supports four transmission antennas. In FIG. 7, Resource Elements (REs) denoted by "0", "1", "2" and "3" indicate the locations of the CRSs of the antenna port indexes 0, 1, 2 and 3, respectively. In FIG. 7, the RE denoted by "D" indicates the location of the DRS.

Hereinafter, the CRS will be described in detail.

The CRS is used to estimate the channel of a physical antenna and is distributed over the entire band as an RS which is able to be commonly received by all UEs located within a cell. The CRS may be used for CSI acquisition and data demodulation.

The CRS is defined in various formats according to the antenna configuration of the transmission side (eNodeB). The 3GPP LTE (e.g., Release-8) system supports various antenna configurations, and a downlink signal transmission side (eNodeB) has three antenna configurations such as a single antenna, two transmission antennas and four transmission antennas. If the eNodeB performs single-antenna transmission, RSs for a single antenna port are arranged. If the eNodeB performs two-antenna transmission, RSs for two antenna ports are arranged using a Time Division Multiplexing (TDM) and/or Frequency Division Multiplexing (FDM) scheme. That is, the RSs for the two antenna ports are arranged in different time resources and/or different frequency resources so as to be distinguished from each other. In addition, if the eNodeB performs four-antenna transmission, RSs for four antenna ports are arranged using the TDM/FDM scheme. The channel information estimated by the downlink signal reception side (UE) through the CRSs may be used to demodulate data transmitted using a transmission scheme such as single antenna transmission, transmit diversity, closed-loop spatial multiplexing, open-loop spatial multiplexing, or Multi-User MIMO (MU-MIMO).

If multiple antennas are supported, when RSs are transmitted from a certain antenna port, the RSs are transmitted at the locations of the REs specified according to the RS pattern and any signal is not transmitted at the locations of the REs specified for another antenna port.

The rule of mapping the CRSs to the RBs is defined by Equation 12.

$$k = 6m + (v + v_{shift}) \bmod 6 \qquad \text{[Equation 12]}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

In Equation 12, k denotes a subcarrier index, l denotes a symbol index, and p denotes an antenna port index. $N_{symb}^{DL}$ denotes the number of OFDM symbols of one downlink slot, $N_{RB}^{DL}$ denotes the number of RBs allocated to the downlink, $n_s$ denotes a slot index, $N_{ID}^{cell}$ denotes a cell ID and mod indicates a modulo operation. The location of the RS in the frequency domain depends on a value $V_{shift}$. Since the value $V_{shift}$ depends on the cell ID, the location of the RS has a frequency shift value which varies according to the cell.

In detail, in order to increase channel estimation performance through the CRSs, the locations of the CRSs in the frequency domain may be shifted so as to be changed according to the cells. For example, if the RSs are located at an interval of three subcarriers, the RSs are arranged on 3k-th subcarriers in one cell and arranged on (3k+1)-th subcarriers in the other cell. In view of one antenna port, the RSs are arranged at an interval of 6 REs (that is, interval of 6 subcarriers) in the frequency domain and are separated from REs, on which RSs allocated to another antenna port are arranged, by 3 REs in the frequency domain.

In addition, power boosting is applied to the CRSs. The power boosting indicates that the RSs are transmitted using higher power by bringing (stealing) the powers of the REs except for the REs allocated for the RSs among the REs of one OFDM symbol.

In the time domain, the RSs are arranged from a symbol index (l=0) of each slot as a starting point at a constant interval. The time interval is differently defined according to the CP length. The RSs are located on symbol indexes 0 and 4 of the slot in case of the normal CP and are located on symbol indexes 0 and 3 of the slot in case of the extended CP. Only RSs for a maximum of two antenna ports are defined in one OFDM symbol. Accordingly, upon four-transmission antenna transmission, the RSs for the antenna ports 0 and 1 are located on the symbol indexes 0 and 4 (the symbol indexes 0 and 3 in case of the extended CP) of the slot and the RSs for the antenna ports 2 and 3 are located on the symbol index 1 of the slot. The frequency locations of the RSs for the antenna ports 2 and 3 in the frequency domain are exchanged with each other in a second slot.

In order to support spectrum efficiency higher than that of the existing 3GPP LTE (e.g., Release-8) system, a system (e.g., an LTE-A system) having the extended antenna configuration may be designed. The extended antenna configuration may have, for example, eight transmission antennas. In the system having the extended antenna configuration, UEs which operate in the existing antenna configuration needs to be supported, that is, backward compatibility needs to be supported. Accordingly, it is necessary to support a RS pattern according to the existing antenna configuration and to design a new RS pattern for an additional antenna configuration. If CRSs for the new antenna ports are added to the system having the existing antenna configuration, RS overhead is rapidly increased and thus data transfer rate is reduced. In consideration of these problems, in an LTE-A (Advanced) system which is an evolution version of the 3GPP LTE system, separate RSs (CSI-RSs) for measuring the CSI for the new antenna ports may be used.

Hereinafter, the DRS will be described in detail.

The DRS (or the UE-specific RS) is used to demodulate data. A precoding weight used for a specific UE upon multi-antenna transmission is also used in an RS without change so as to estimate an equivalent channel, in which a transfer channel and the precoding weight transmitted from each transmission antenna are combined, when the UE receives the RSs. The existing 3GPP LTE system (e.g., Release-8) supports four-transmission antenna transmission as a maximum and the DRS for Rank 1 beamforming is defined. The DRS for Rank 1 beamforming is also denoted by the RS for the antenna port index 5. The rule of the DRS mapped on the RBs is defined by Equations 13 and 14. Equation 13 is for the normal CP and Equation 14 is for the extended CP.

$$k = (k') \bmod N_{sc}^{RB} + N_{sc}^{RB} \cdot n_{PRB} \quad \text{[Equation 13]}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

$$k = (k') \bmod N_{sc}^{RB} + N_{sc}^{RB} \cdot n_{PRB} \quad \text{[Equation 14]}$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

In Equations 13 and 14, k denotes a subcarrier index, l denotes a symbol index, and p denotes an antenna port index. $N_{SC}^{RB}$ denotes the resource block size in the frequency domain and is expressed by the number of subcarriers. $n_{PRB}$ denotes a physical resource block number. $N_{RB\text{-}PDSCH}$ denotes the bandwidth of the RB of the PDSCH transmission. $n_s$ denotes a slot index, and $N_{ID}^{cell}$ denotes a cell ID, and mod indicates a modulo operation. The location of the RS in the frequency domain depends on a value $V_{shift}$. Since the value $V_{shift}$ depends on the cell ID, the location of the RS has a frequency shift value which varies according to the cell.

In the LTE-A system which is the evolution version of the 3GPP LTE system, high-order MIMO, multi-cell transmission, evolved MU-MIMO or the like is considered. In order to support efficient RS management and a developed transmission scheme, DMRS-based data demodulation is considered. That is, separately from the DMRS (antenna port index 5) for Rank 1 beamforming defined in the existing 3GPP LTE (e.g., Release-8) system, DMRSs for two or more layers may be defined in order to support data transmission through the added antenna. DMRS may be configured to be transmitted only in a resource block and layer in which DL transmission is scheduled by an eNB.

An exemplary DMRS pattern newly introduced to LTE-A (LTE Release-10 or the next LTE Release) will hereinafter be described with reference to FIG. 8, including view (a) and view (b). The overhead of a DMRS newly introduced to support an extended antenna configuration (e.g., a maximum of 8 Tx antennas) may vary. In case of a lower rank (e.g., either Rank 1 or Rank 2), DMRS may be arranged on 12 REs in one RB pair (See FIG. 8(a)). In case of a higher rank (e.g., any one of Ranks 3 to 8), DMRS may be present in 24 REs of one RB pair (See FIG. 8(b)). When DMRSs are arranged on RB, DMRS for each layer may be multiplexed and arranged on the RB. Time Division Multiplexing (TDM) indicates that DMRSs for two or more layers are allocated to different time resources (e.g., OFDM symbols). Frequency Division Multiplexing (FDM) indicates that DMRSs for two or more layers are allocated to different frequency resources (e.g., subcarriers). Code Division Multiplexing (CDM) indicates that DMRSs for two or more layers arranged on the same radio resources are multiplexed using an orthogonal sequence (or orthogonal covering) either between OFDM symbols for the corresponding RS resource elements or between frequency subcarriers.

Figure 8:
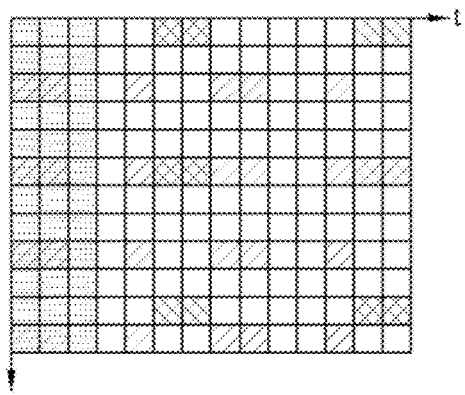
FIG. 8 is a diagram shows a UE-specific reference signal pattern defined in the 3GPP LTE-A system.
Figure 8:
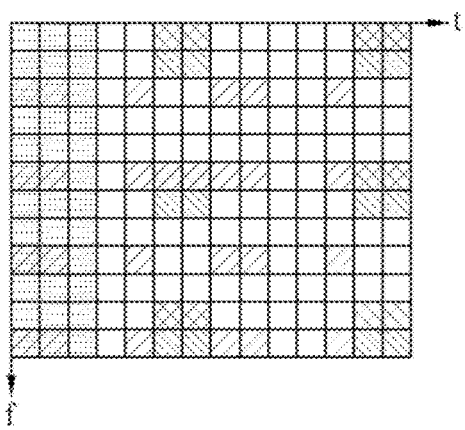

The DMRS pattern shown in FIG. 8 is configured in a mixed form of CDM and FDM. For example, CDM group 1 may be mapped to ports 1, 2, 5 and 6, and CDM group 2 may be mapped to ports 3, 4, 7 and 8. According to such mapping relationship, the number of REs occupied by DMRSs per channel rank is changed. In accordance with a CDM+FDM scheme, 12 REs/RBs/ports are used for DMRS for Rank 1 or Rank 2 (See FIG. 8(a)), 24 REs/RBs/ports are used for DMRS for any one of Ranks 3 to 8 (See FIG. 8(b)). Although the above-mentioned description has assumed that antenna ports related to DMRS transmission used for PDSCH demodulation are antenna ports 1 to 8, the scope of the present invention is not limited thereto. For example, in order to discriminate between a conventional CRS-related antenna port (antenna ports 0 to 3) and a conventional DRS-related antenna port (antenna port 5), antenna ports related to DMRS transmission may be represented by antenna ports 7 to 14.

Cooperative Multi-Point (CoMP)

According to the improved system performance requirements of the 3GPP LTE-A system, CoMP transmission/ reception technology (may be referred to as co-MIMO, collaborative MIMO or network MIMO) is proposed. The CoMP technology can increase the performance of the UE located on a cell edge and increase average sector throughput.

In general, in a multi-cell environment in which a frequency reuse factor is 1, the performance of the UE located on the cell edge and average sector throughput may be reduced due to Inter-Cell Interference (ICI). In order to reduce the ICI, in the existing LTE system, a method of enabling the UE located on the cell edge to have appropriate throughput and performance using a simple passive method such as Fractional Frequency Reuse (FFR) through the UE-specific power control in the environment restricted by interference is applied. However, rather than decreasing the use of frequency resources per cell, it is preferable that the ICI is reduced or the UE reuses the ICI as a desired signal. In order to accomplish the above object, a CoMP transmission scheme may be applied.

The CoMP scheme applicable to the downlink may be largely classified into a Joint Processing (JP) scheme and a Coordinated Scheduling/Beamforming (CS/CB) scheme.

In the JP scheme, each point (eNodeB) of a CoMP unit may use data. The CoMP unit refers to a set of eNodeBs used in the CoMP scheme. The JP scheme may be classified into a joint transmission scheme and a dynamic cell selection scheme.

The joint transmission scheme refers to a scheme for transmitting a PDSCH from a plurality of points (a part or the whole of the CoMP unit). That is, data transmitted to a single UE may be simultaneously transmitted from a plurality of transmission points. According to the joint transmission scheme, it is possible to coherently or non-coherently improve the quality of the received signals and to actively eliminate interference with another UE.

The dynamic cell selection scheme refers to a scheme for transmitting a PDSCH from one point (of the CoMP unit). That is, data transmitted to a single UE at a specific time is transmitted from one point and the other points in the cooperative unit at that time do not transmit data to the UE. The point for transmitting the data to the UE may be dynamically selected.

According to the CS/CB scheme, the CoMP units may cooperatively perform beamforming of data transmission to a single UE. Although only a serving cell transmits the data, user scheduling/beamforming may be determined by the coordination of the cells of the CoMP unit.

In uplink, coordinated multi-point reception refers to reception of a signal transmitted by coordination of a plurality of geographically separated points. The CoMP scheme applicable to the uplink may be classified into Joint Reception (JR) and Coordinated Scheduling/Beamforming (CS/CB).

The JR scheme indicates that a plurality of reception points receives a signal transmitted through a PUSCH, the CS/CB scheme indicates that only one point receives a PUSCH, and user scheduling/beamforming is determined by the coordination of the cells of the CoMP unit.

Sounding RS (SRS)

An SRS is used for enabling an eNodeB to measure channel quality so as to perform frequency-selective scheduling on the uplink and is not associated with uplink data and/or control information transmission. However, the present invention is not limited thereto and the SRS may be used for improved power control or supporting of various start-up functions of UEs which are not recently scheduled. Examples of the start-up functions may include, for example, initial Modulation and Coding Scheme (MCS), initial power control for data transmission, timing advance, and frequency-semi-selective scheduling (scheduling for selectively allocating frequency resources in a first slot of a subframe and pseudo-randomly hopping to another frequency in a second slot).

In addition, the SRS may be used for downlink channel quality measurement on the assumption that the radio channel is reciprocal between the uplink and downlink. This assumption is particularly valid in a Time Division Duplex (TDD) system in which the same frequency band is shared between the uplink and the downlink and is divided in the time domain.

The subframe through which the SRS is transmitted by a certain UE within the cell is indicated by cell-specific broadcast signaling. 4-bit cell-specific "srsSubframeConfiguration" parameter indicates 15 possible configurations of the subframe through which the SRS can be transmitted within each radio frame. By such configurations, it is possible to provide adjustment flexibility of SRS overhead according to a network arrangement scenario. The remaining one (sixteenth) configuration of the parameters indicates the switch-off of the SRS transmission within the cell and is suitable for a serving cell for serving high-rate UEs.

Figure 9:
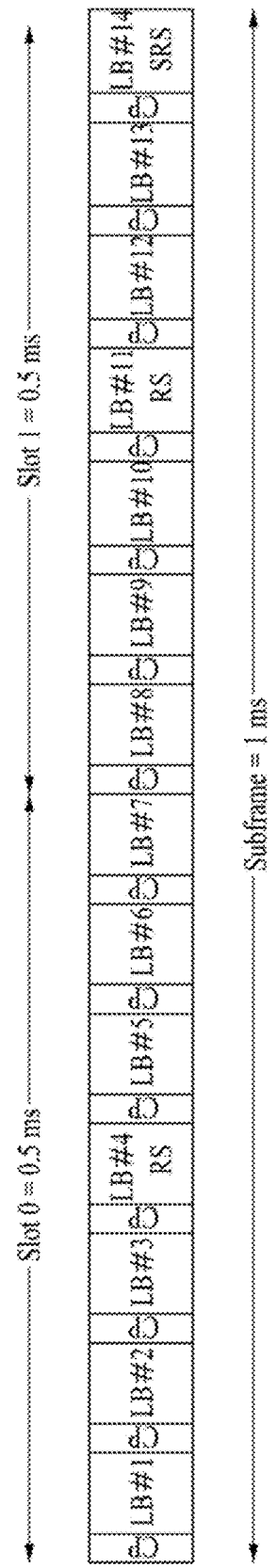
FIG. 9 is a diagram illustrating reference signal transmission in an uplink subframe.

As shown in FIG. 9, the SRS is always transmitted on a last SC-FDMA symbol of the configured subframe. Accordingly, the SRS and a Demodulation RS (DMRS) are located on different SC-FDMA symbols. PUSCH data transmission is not allowed on the SC-FDMA symbol specified for SRS transmission and thus sounding overhead does not approximately exceed 7% even when it is highest (that is, even when SRS transmission symbols are present in all subframes).

Each SRS symbol is generated by the basic sequence (random sequence or Zadoff-Ch (ZC)-based sequence set) with respect to a given time unit and frequency band, and all UEs within the cell use the same basic sequence. At this time, the SRS transmission of the plurality of UEs within the cell in the same time unit and the same frequency band is orthogonally distinguished by different cyclic shifts of the base sequence allocated to the plurality of UEs. The SRS sequences of different cells can be distinguished by allocating different basic sequences to respective cells, but the orthogonality between the different basic sequences is not guaranteed.

Relay Node (RN)

The RN may be considered for, for example, enlargement of high data rate coverage, improvement of group mobility, temporary network deployment, improvement of cell edge throughput and/or provision of network coverage to a new area.

Referring to FIG. 1 again, the RN 120 forwards data transmitted or received between the eNodeB 110 and the UE 131, two different links (backhaul link and access link) are applied to the respective carrier frequency bands having different attributes. The eNodeB 110 may include a donor cell. The RN 120 is wirelessly connected to a radio access network through the donor cell 110.

The backhaul link between the eNodeB 110 and the RN 120 may be represented by a backhaul downlink if downlink frequency bands or downlink subframe resources are used, and may be represented by a backhaul uplink if uplink frequency bands or uplink subframe resources are used. Here, the frequency band is resource allocated in a Frequency Division Duplex (FDD) mode and the subframe is resource allocated in a Time Division Duplex (TDD) mode. Similarly, the access link between the RN 120 and the UE(s) 131 may be represented by an access downlink if downlink frequency bands or downlink subframe resources are used, and may be represented by an access uplink if uplink frequency bands or uplink subframe resources are used. FIG. 1 shows the setting of the backhaul uplink/downlink and the access uplink/downlink of the FDD-mode RN.

The eNodeB must have functions such as uplink reception and downlink transmission and the UE must have functions such as uplink transmission and downlink reception. The RN must have all functions such as backhaul uplink transmission to the eNodeB, access uplink reception from the UE, the backhaul downlink reception from the eNodeB and access downlink transmission to the UE.

Figure 10:
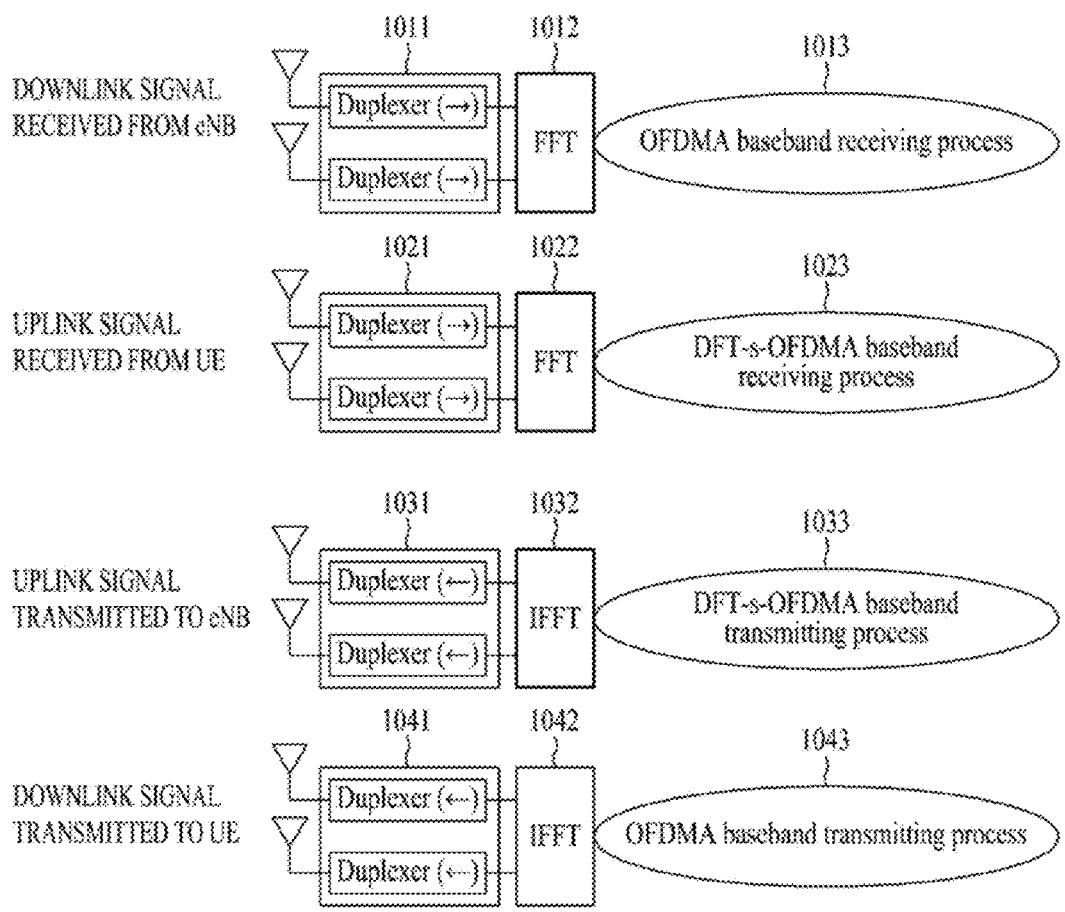
FIG. 10 is a diagram exemplarily shows a transceiver of a Frequency Division Duplex-mode relay node.

FIG. 10 is a diagram showing an example of implementing transmission and reception functions of a FDD-mode RN. The reception function of the RN will now be conceptually described. A downlink signal received from the eNodeB is forwarded to a Fast Fourier Transform (FFT) module 1012 through a duplexer 1011 and is subjected to an OFDMA baseband reception process 1013. An uplink signal received from the UE is forwarded to a FFT module 1022 through a duplexer 1021 and is subjected to a Discrete Fourier Transform-spread-OFDMA (DFT-s-OFDMA) baseband reception process 1023. The process of receiving the downlink signal from the eNodeB and the process of receiving the uplink signal from the UE may be simultaneously performed. The transmission function of the RN will now be described. The uplink signal transmitted to the eNodeB is transmitted through a DFT-s-OFDMA baseband transmission process 1033, an Inverse FFT (IFFT) module 1032 and a duplexer 1031. The downlink signal transmitted to the UE is transmitted through an OFDM baseband transmission process 1043, an IFFT module 1042 and a duplexer 1041. The process of transmitting the uplink signal to the eNodeB and the process of transmitting the downlink signal to the UE may be simultaneously performed. In addition, the duplexers shown as functioning in one direction may be implemented by one bidirectional duplexer. For example, the duplexer 1011 and the duplexer 1031 may be implemented by one bidirectional duplexer and the duplexer 1021 and the duplexer 1041 may be implemented by one bidirectional duplexer. The bidirectional duplexer may branch into the IFFT module associated with the transmission and reception on a specific carrier frequency band and the baseband process module line.

In association with the use of the band (or the spectrum) of the RN, the case where the backhaul link operates in the same frequency band as the access link is referred to as "in-band" and the case where the backhaul link and the access link operate in different frequency bands is referred to as "out-band". In both the in-band case and the out-band case, a UE which operates according to the existing LTE system (e.g., Release-8), hereinafter, referred to as a legacy UE, must be able to be connected to the donor cell.

The RN may be classified into a transparent RN or a non-transparent RN depending on whether or not the UE recognizes the RN. The term "transparent" indicates that the UE cannot recognize whether communication with the network is performed through the RN and the term "non-transparent" indicates that the UE recognizes whether communication with the network is performed through the RN.

In association with the control of the RN, the RN may be classified into a RN configured as a part of the donor cell or a RN for controlling the cell.

The RN configured as the part of the donor cell may have a RN ID, but does not have its cell identity. When at least a part of Radio Resource Management (RRM) of the RN is controlled by the eNodeB to which the donor cell belongs (even when the remaining parts of the RRM are located on the RN), the RN is configured as the part of the donor cell. Preferably, such an RN can support a legacy UE. For example, examples of such an RN include various types of relays such as smart repeaters, decode-and-forward relays, L2 (second layer) relays and Type-2 relays.

In the RN for controlling the cell, the RN controls one or several cells, unique physical layer cell identities are provided to the cells controlled by the RN, and the same RRM mechanism may be used. From the viewpoint of the UE, there is no difference between access to the cell controlled by the RN and access to the cell controlled by a general eNodeB. Preferably, the cell controlled by such an RN may support a legacy UE. For example, examples of such an RN include self-backhauling relays, L3 (third layer) relays, Type-1 relays and Type-1a relays.

The Type-1 relay is an in-band relay for controlling a plurality of cells, which appears to be different from the donor cell, from the viewpoint of the UE. In addition, the plurality of cells has respective physical cell IDs (defined in the LTE Release-8) and the RN may transmit its synchronization channel, RSs, etc. In a single-cell operation, the UE may directly receive scheduling information and HARQ feedback from the RN and transmit its control channel (Scheduling Request (SR), CQI, ACK/NACK, etc.) to the RN. In addition, a legacy UE (a UE which operates according to the LTE Release-8 system) regards the Type-1 relay as a legacy eNodeB (an eNodeB which operates according to the LTE Release-8 system). That is, the Type-1 relay has backward compatibility. The UEs which operates according to the LTE-A system regard the Type-1 relay as an eNodeB different from the legacy eNodeB, thereby achieving performance improvement.

The Type-1a relay has the same characteristics as the above-described Type-1 relay except that it operates as an out-band relay. The Type-1a relay may be configured so as to minimize or eliminate an influence of the operation thereof on an L1 (first layer) operation.

The Type-2 relay is an in-band relay and does not have a separate physical cell ID. Thus, a new cell is not established. The Type-2 relay is transparent to the legacy UE and the legacy UE does not recognize the presence of the Type-2 relay. The Type-2 relay can transmit a PDSCH, but does not transmit at least a CRS and a PDCCH.

In order to enable the RN to operate as the in-band relay, some resources in a time-frequency space must be reserved for the backhaul link so as not to be used for the access link. This is called resource partitioning.

The general principle of the resource partitioning in the RN will now be described. The backhaul downlink and the access downlink may be multiplexed on one carrier frequency using a Time Division Multiplexing (TDM) scheme (that is, only one of the backhaul downlink or the access downlink is activated in a specific time). Similarly, the backhaul uplink and the access uplink may be multiplexed on one carrier frequency using the TDM scheme (that is, only one of the backhaul uplink or the access uplink is activated in a specific time).

The multiplexing of the backhaul link using a FDD scheme indicates that backhaul downlink transmission is performed in a downlink frequency band and the backhaul uplink transmission is performed in an uplink frequency band. The multiplexing of the backhaul link using the TDD scheme indicates that the backhaul downlink transmission is performed in a downlink subframe of the eNodeB and the RN and the backhaul uplink transmission is performed in an uplink subframe of the eNodeB and the RN.

In the in-band relay, for example, if the backhaul downlink reception from the eNodeB and the access downlink transmission to the UE are simultaneously performed in a predetermined frequency band, the signal transmitted from the transmitter of the RN may be received by the receiver of the RN and thus signal interference or RF jamming may occur in the RF front end of the RN. Similarly, if the access uplink reception from the UE and the backhaul uplink transmission to the eNodeB are simultaneously performed in a predetermined frequency band, signal interference may occur in the RF front end of the RN. Accordingly, it is difficult to implement the simultaneous transmission and reception in one frequency band at the RN unless the received signal and the transmitted signal are sufficiently separated (for example, unless the transmission antennas and the reception antennas are sufficiently separated from each other (for example, on the ground or under the ground) in terms of geographical positions).

Figure 11:
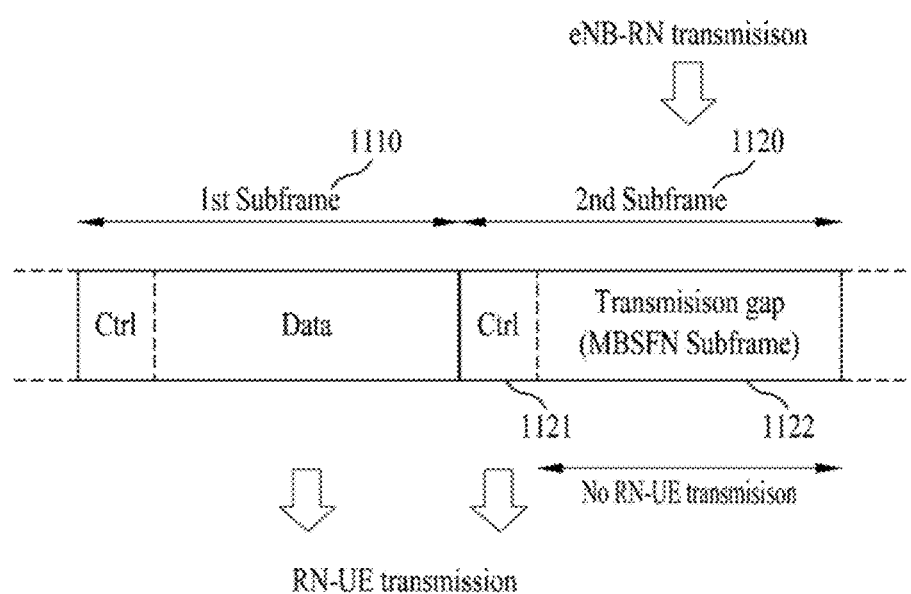
FIG. 11 is a diagram exemplarily shows relay node resource partitioning.

As a method for solving the signal interference, the RN operates so as not to transmit a signal to the UE while a signal is received from the donor cell. That is, a gap may be generated in the transmission from the RN to the UE and any transmission from the RN to the UE (including the legacy UE) may not be performed. Such a gap may be set by configuring a Multicast Broadcast Single Frequency Network (MBSFN) subframe (see FIG. 11). In FIG. 11, a first subframe 1110 is a normal subframe, in which a downlink (that is, access downlink) control signal and data is transmitted from the RN to the UE, and a second subframe 1120 is an MBSFN subframe, in which a control signal is transmitted from the RN to the UE in a control region 1121 of the downlink subframe, but any signal is not transmitted from the RN to the UE in the remaining region 1122 of the downlink subframe. Since the legacy UE expects the transmission of the PDCCH in all downlink subframes (that is, the RN needs to enable the legacy UEs within its own area to receive the PDCCH in every subframe so as to perform a measurement function), for the correct operation of the legacy UEs, it is necessary to transmit the PDCCH in all the downlink subframes. Accordingly, even on the subframe (the second subframe 1120)) set for the transmission of the downlink (that is, the backhaul downlink) from the eNodeB to the RN, the RN needs to transmit the access downlink in first N (N=1, 2 or 3) OFDM symbol intervals of the subframe, without receiving the backhaul downlink. Since the PDCCH is transmitted from the RN to the UE in the control region 1121 of the second subframe, it is possible to provide backward compatibility to the legacy UE served by the RN. While any signal is not transmitted from the RN to the UE in the remaining region 1122 of the second subframe, the RN may receive the signal transmitted from the eNodeB. Accordingly, the resource partitioning disables the in-band RN to simultaneously perform the access downlink transmission and the backhaul downlink reception.

The second subframe 1122 using the MBSFN subframe will now be described in detail. The control region 1121 of the second subframe may be a RN non-hearing interval. The RN non-hearing interval refers to an interval in which the RN does not receive a backhaul downlink signal and transmits an access downlink signal. This interval may be set to 1, 2 or 3 OFDM lengths as described above. The RN performs the access downlink transmission to the UE in the RN non-hearing interval 1121 and performs the backhaul downlink reception from the eNodeB in the remaining region 1122. At this time, since the RN cannot simultaneously perform the transmission and reception in the same frequency band, it takes a certain length of time to switch the RN from the transmission mode to the reception mode. Accordingly, it is necessary to set a guard time (GT) to switch the RN from the transmission mode to the reception mode in a first portion of the backhaul downlink reception region 1122. Similarly, even when the RN receives the backhaul downlink from the eNodeB and transmits the access downlink to the UE, a guard time (GT) to switch the RN from the reception mode to the transmission mode may be set. The length of the guard time may be set to values of the time domain, for example, values of k (k≥1) time samples Ts or one or more OFDM symbol lengths. Alternatively, if the backhaul downlink subframes of the RN are consecutively set or according to a predetermined subframe timing alignment relationship, the guard time of a last portion of the subframes may not be defined or set. Such a guard time may be defined only in the frequency domain set for the transmission of the backhaul downlink subframe, in order to maintain backward compatibility (the legacy UE cannot be supported if the guard time is set in the access downlink interval). The RN can receive a PDCCH and a PDSCH from the eNodeB in the backhaul downlink reception interval 1122 except for the guard time. Such PDCCH and the PDSCH are physical channels dedicated for RN and thus may be represented by an R-PDCCH (Relay-PDCCH) and an R-PDSCH (Relay-PDSCH). Alternatively, R-PDSCH may be simply referred to as PDSCH. In accordance with the present invention, a physical downlink shared channel (PDSCH) for a relay node (RN) may be represented by PDSCH only for convenience of description and better understanding of the present invention.

Backhaul Link Power Allocation

A method for allocating transmission (Tx) power in backhaul link transmission between eNB and RN according to various embodiments of the present invention will hereinafter be described in detail. Backhaul Tx power is flexibly allocated such that channel estimation and decoding of an R-PDCCH as a channel for transmitting various control signals from the eNB to the RN can be more correctly and effectively performed.

Power Allocation in Units of RB Pair

Power allocation for use in a backhaul link according to the present invention will hereinafter be described on the basis of one RB pair. In this case, one RB pair may be defined as the length of one subframe (corresponding to 2 slots or 14 OFDM symbols for use in a normal CP) on a time domain×the size of one RB (composed of 12 subcarriers) on a frequency domain. In addition, an RB pair may correspond to a Physical Resource Block (RPB) pair.

In accordance with one embodiment of the present invention, higher power may be allocated to an RB pair to which R-PDCCH is transmitted as compared to other regions. In more detail, the aforementioned higher power allocation may also be considered as power boosting of the RB pair in which R-PDCCH is transmitted. Power boosting indicates that power is derived from REs other than some REs to which power boosting is applied so that data or information can be transmitted with higher power at the corresponding RE. Through the power boosting for the RB pair related to R-PDCCH transmission, the RN can more correctly decode important control information.

The aforementioned power boosting may be applied only to a transmission signal of the R-PDCCH, may be applied only to a reference signal (RS) for demodulating the R-PDCCH, or may be applied to both the transmission signal and the reference signal (RS) of R-PDCCH. If DMRS is used to perform R-PDCCH demodulation, a specific RN-dedicated RS (or an RN-specific RS) is used so that the use of power boosting only in the RB pair in which the R-PDCCH is transmitted may be considered to exhibit efficient performance.

On the other hand, the eNB and the RN may transmit/receive, via higher layer, signals requesting or indicating whether to perform power boosting for the R-PDCCH in consideration of a channel state of a backhaul link and how much power boosting will be applied if power boosting is applied.

If the RN performs channel estimation using the DMRS, channel estimation for the R-PDCCH may also be used to demodulate a data signal transmitted through a PDSCH in the same RB pair or different RB pairs. In this case, power boosting is not applied to a data signal through the PDSCH, so that decoding throughput of the data signal may be deteriorated when the channel estimated by the power-boosted DMRS is applied to the data signal without change. Accordingly, if the reference signal (RS) for the R-PDCCH is power-boosted, appropriate interpolation with DMRS of the PDSCH is performed by the RN in consideration of the power boosting degree so that the data signal can be correctly decoded.

Power Allocation on Basis of Slot

The above-mentioned embodiment of the present invention has described backhaul link power allocation on the basis of one RB pair. In addition, according to one example of the present invention, a first slot and a second slot contained in one RB pair may be assigned different Tx powers.

For example, higher Tx power may be assigned to the first slot of one RB pair as compared to the second slot, or higher Tx power may be assigned to the second slot as compared to the first slot. Alternatively, predetermined power may be assigned to a DMRS of the first slot of one RB pair, and no power (i.e., a zero-power signal or null signal) may be assigned to a DMRS of the second slot.

In order to determine which slot will be power-boosted within one RB pair, the operation of RN for receiving control information and data through a backhaul DL link is considered. In order for the RN to receive data for the RN over a PDSCH, the RN must receive a DL grant including information such as DL resource allocation information from the eNB over the R-PDCCH, and recognize control information (i.e., position of PDSCH for the RN, MCS level, etc.) indicated by the DL grant, so that it can receive and decode the PDSCH. In addition, the RN may inform the eNB of the PDSCH decoding result upon transmission of ACK/NACK. In other words, PDSCH decoding may be performed only after reception of the DL grant over the R-PDCCH. Considering the above, if the DL grant is transmitted from the second slot of a certain subframe, PDSCH decoding can be performed only after one subframe has been completely received, resulting in reduction in a time available for PDSCH decoding by the RN. If transmission of the DL grant through the R-PDCCH is limited to a first slot of the backhaul DL subframe, the RN can apply a time corresponding to the second slot to perform the PDSCH decoding. As such, the RN can have more time for PDSCH decoding, resulting in reduction in RN implementation costs. For example, a high-speed decoder (i.e., a high-priced decoder) need not be used. As described above, if the R-PDCCH is limited to be positioned only in the first slot of one RB pair, it is preferable that higher Tx power be assigned to the first slot than the second slot.

Figure 12:
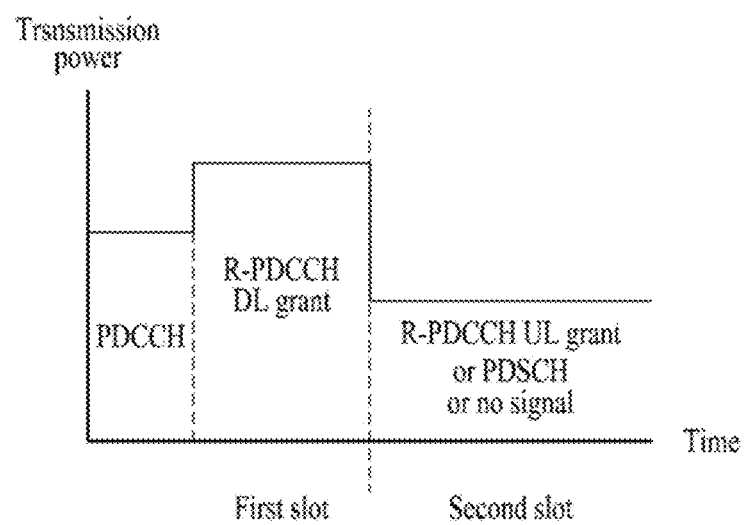
FIG. 12 is a diagram illustrating that more power is allocated to a first slot in a resource block (RB) pair to which a Relay-Physical Downlink Control Channel (R-PDCCH) is transmitted.

FIG. 12 is a conceptual diagram illustrating that higher power is allocated to a first slot in an RB pair in which R-PDCCH is transmitted. Referring to FIG. 12, a part denoted by PDCCH in the first slot is a part in which the RN does not receive a backhaul DL signal (see non-hearing interval 1121 of FIG. 11), and the part may be excluded from an object to which backhaul link power boosting is applied. As detailed examples for power boosting at the first slot of one RB pair, power boosting can be applied to one or both of an R-PDCCH signal and a reference signal (RS).

Alternatively, even when no signal (or zero-power signal) is applied to the second slot of one RB pair, the RS may be transmitted with constant power within the second slot, so as to prevent deterioration of overall channel estimation performance caused when the RS is not transmitted in some slots under the condition that channel estimation is simultaneously performed in a bundle composed of the one RB pair and some contiguous RB pairs. As a result, neither data nor control signal is transmitted in the second slot, but the RS (DMRS and/or CRS) may be transmitted in the second slot. For example, when a DMRS for a specific antenna port (e.g., at least one of antenna ports 7 to 14) is transmitted in one (e.g., a first slot) of two slots contained in one certain RB pair, a DMRS for the same antenna port as in the DMRS of the one slot (e.g., the first slot) may also be configured to transmitted in the other one (e.g., a second slot) of the two slots of the corresponding RB pair. In this case, RS transmission power of one of the two slots contained in one RB pair may be identical to that of the other slot.

As shown in FIG. 12, a UL grant or a PDSCH may be transmitted or no signal may be transmitted in the second slot of the RB pair in which a DL grant is transmitted, and associated examples thereof will hereinafter be described in detail.

UL Grant Transmitted in Second Slot

UL grant may be transmitted in a second slot of one RB pair of a backhaul downlink. The UL grant includes control information about UL transmission resource allocation of the RN, and may be provided from the eNB to the RN through the R-PDCCH.

The UL grant transmitted in the second slot may be limited to the same RN as an RN acting as a destination of DL transmission by the DL grant in the first slot. Such limitation may be useful especially for backhaul link transmission employing a DMRS because the same precoding can be applied to the first and second slots. In more detail, precoding is applied to the DMRS and the DMRS is an RN-specific RS, the aforementioned limitation is useful especially for backhaul link transmission employing DMRS. On the other hand, if a CRS is applied to backhaul DL transmission, the aforementioned limitation may not be applied.

Provided that DMRS is used for backhaul link transmission and the UL grant and the DL grant are transmitted for the same RN, the RN that receives one RB pair including a first slot to which power boosting is applied, may operate in such a manner that the UL grant received in the second slot is decoded only using the DMRS of the first slot. Provided that the DMRS received in the first slot is sufficiently power-boosted for DL grant decoding of the corresponding RN, the UL grant of the second slot can be decoded using only the DMRS of the first slot. In this manner, if the RN decodes the UL grant of the second slot only using the DMRS of the first slot, the eNB may set DMRS power of the second slot to zero (0), or may utilize the corresponding power for transmission of other signals as necessary.

If the DMRS power of the second slot is lower than the DMRS power of the first slot and is higher than zero (0), the RN may use DMRSs of the first and second slots so as to more correctly perform channel estimation. If the RN performs channel estimation using DMRSs of the first and second slots, a predetermined power boosting level for the first slot (or a difference in DMRS transmission power between the first slot and the second slot) may be considered. The RN may decode the UL grant of the second slot using channel estimation in which power boosting of the first slot is considered. For the above-mentioned operation, the RN needs to recognize DMRS transmission power in each slot. If the transmission power of the DMRS is not equal to zero (0), the corresponding power offset can be transmitted from the eNB to the RN through RRC signaling or L1/L2 signaling.

In accordance with the above-mentioned description, total transmission power required by the eNB may be saved as much as the transmission power of the second slot of one RB pair is set low. The saved transmission power can be adapted to increase transmission power of a signal transmitted through another RB pair within the same time interval (subframe). For example, the saved transmission power may be used to perform boosting of transmission power (DMRS transmission power and/or R-PDCCH signal transmission power) of the UL grant transmitted in the second slot of another RB pair. For example, under the condition that the DL grant for a specific RN is not present but the UL grant for the specific RN is present, if the UL grant is transmitted to the second slot, the transmission power of the first slot for the corresponding RN is saved so that the saved transmission power can be used to perform power boosting of the DL grant of another RN as described above. Alternatively, in association with the UL grant of the second slot for the corresponding RN, power boosting may be applied to another RN whose second slot has no DRMS (or the UL grant is not present in the second slot of the other RN) using the saved transmission power.

Figure 13:
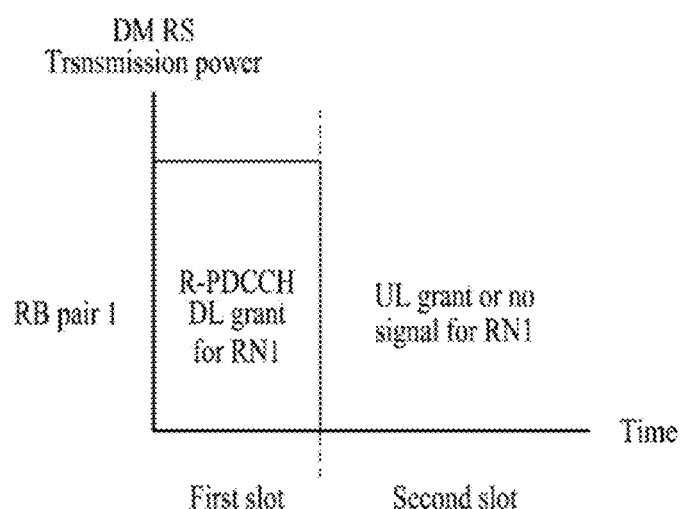
FIG. 13 is a diagram shows examples in which different DMRS (Demodulation Reference Signal) transmission powers are configured in a first slot and a second slot within a resource block (RB) pair.
Figure 13:
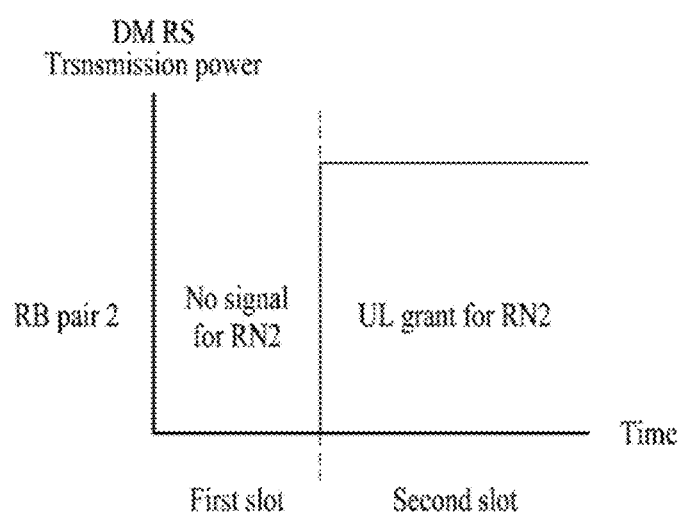

FIG. 13 shows a variety of examples in which DMRS transmission power is differently configured in a first slot and a second slot in association with two RNs configured to receive signals in different RB pairs (i.e., RB pair 1 and RB pair 2). Differently from the example of FIG. 12, FIG. 13 does not show a PDCCH region unrelated to power allocation between the eNB and the RN. Referring to FIG. 13, DMRS transmission power may be boosted only in the first slot of the RB pair 1 for use in the RN 1, and DMRS transmission power may be set to a low value in the second slot of the RB pair 1. Due to the aforementioned power allocation in the RB pair 1, low DMRS transmission power is assigned to the first slot of the RB pair 2 for use in the RN 2, and DMRS transmission power may be boosted only in the second slot. That is, the transmission power saved in the RB pair 2 of the first slot may be used to boost DMRS power of the RB pair 1, and the transmission power saved in the RB pair 1 of the second slot may be used to boost DMRS power of the RB pair 2. Through the above-mentioned power allocation, effective power sharing can be implemented.

In order to more effectively apply the above-mentioned power sharing, the position of a DMRS used for decoding the R-PDCCH may be variably configured according to individual situations.

First of all, the RN may attempt to decode the DL grant of the first slot using the DMRS of the first slot. For example, when the RN decodes the DL grant of the first slot using the DMRS of the first slot, if the DL grant of the first slot is decoded, the RN may decode the UL grant of the second slot using the DMRS of the first slot. Alternatively, provided that the RN fails to decode the DL grant of the first slot using the DMRS of the first slot, the RN may decode the UL grant of the second slot using the DMRS of the second slot.

Alternatively, in order to implement more simplified operations, when decoding the UL grant of the second slot, the RN may be predefined to always use the DMRS of the first slot, may be predefined to always use the DMRS of the second slot, or may be predefined to always use all DMRSs of the first and second slots.

PDSCH Transmitted in Second Slot

PDSCH transmitted in the second slot may be limited only to the same RN as a RN related to the DL grant of the first slot. This limitation may be useful for backhaul link transmission employing a DMRS because the same precoding can be applied to the first slot and the second slot. In more detail, precoding is applied to the DMRS and the DMRS is an RN-specific RS, so that the aforementioned limitation is useful. On the other hand, if a CRS is used for backhaul DL transmission, the aforementioned limitation need not be applied.

Referring back to FIG. 12, under the condition that power boosting is applied to the DL grant, in order for the RN to correctly decode a PDSCH indicated by the corresponding DL grant, it is necessary for the RN to properly reflect a difference in DMRS power between the first slot and the second slot when performing channel estimation. For this operation, the eNB may inform the corresponding RN of the difference in DMRS power between the first slot and the second slot of the RB pair in which the DL grant is transmitted. Information about such power difference may be transmitted to the RN using either a physical layer signal through an R-PDSCH or a higher layer signal. Alternatively, in order to easily implement the channel estimation operation, the embodiment of the present invention may include that transmission powers of DMRSs of the first and second slots of a certain RB pair are all boosted.

No Signal Transmitted in Second Slot

If it is assumed that no signal is transmitted in the second slot of the RB pair in which the DL grant is transmitted in the first slot, DMRS transmission power of the second slot may be set to zero (0). In this case, the RN may not apply the DMRS of the corresponding region to channel estimation for another signal (e.g., PDSCH), because wrong channel estimation may occur due to low transmission power of the corresponding region and a difference in transmission power. As a result, if the RN does not detect a signal in the second slot of the RB pair in which the DL grant is transmitted in the first slot, the RN assumes that the transmission power of a DMRS in the second slot of the corresponding RB pair is zero (0), such that channel estimation or the like can be performed on the above-mentioned assumption.

Backhaul Link Channel Estimation

A channel estimation method and a precoding method for a backhaul link between the eNB and the RN according to embodiments of the present invention will hereinafter be described in detail. According to the embodiments of the present invention, different channel estimation methods may be used according to whether a backhaul link control channel (e.g., R-PDCCH) is included in backhaul link resources. According to one embodiment of the present invention, the RN that performs channel estimation for demodulating DL data using the DMRS may apply different channel estimation methods and different RB bundling methods to one RB pair in which an R-PDCCH is transmitted and the other RB pair in which no R-PDCCH is transmitted. As a result, R-PDCCH and PDSCH can be effectively multiplexed on backhaul DL resources.

In general, in order to increase channel estimation performance using the DMRS, channel estimation may be performed in units of one RB bundle composed of a certain number of contiguous RB pairs. In this case, the same precoding and/or the same power allocation are/is applied to one RB bundle. Therefore, the receiver may simultaneously perform channel estimation using all the DMRSs of one RB bundle. For example, a channel obtained by averaging channels estimated through all the DMRSs of one RB bundle may be used as a channel for demodulation for all the RB pairs of the corresponding RB bundle. However, provided that the RB pair in which the R-PDCCH is transmitted is present, the above-mentioned channel estimation method in units of an RB bundle may be inappropriate, and a detailed description of a channel estimation method applied to the RB pair in which the R-PDCCH is transmitted will be given below.

Channel Estimation Operation in RB Pair in which R-PDCCH is Transmitted

A channel estimation operation of the RB pair in which R-PDCCH is transmitted will hereinafter be described in detail.

Figure 14:
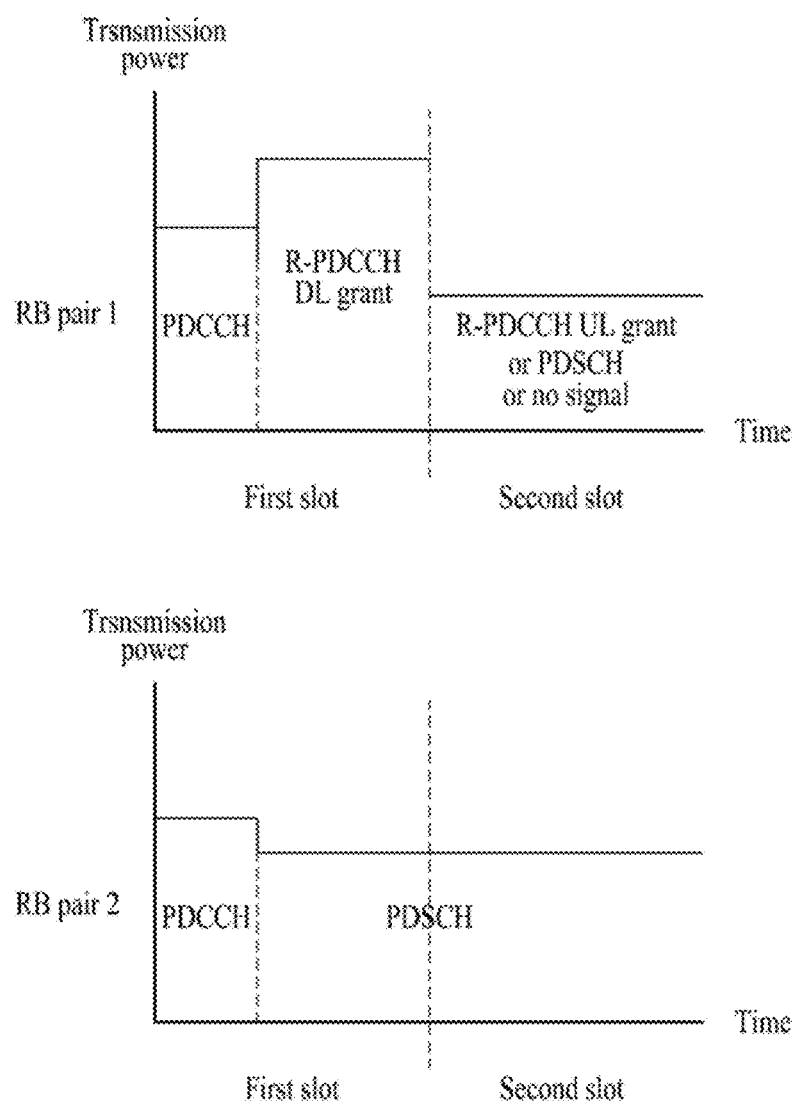
FIG. 14 is a diagram exemplarily shows a power allocation of a first slot and a second slot of one RB pair.

FIG. 14 shows exemplary power allocation for use in each of the first slot and the second slot within one RB pair. In the RB pair 1 and the RB pair 2 shown in FIG. 14, a specific part denoted by PDCCH in the first slot is a part in which the RN does not receive a backhaul DL signal (see non-hearing interval 1121 of FIG. 11), so that the PDCCH part is unrelated to the backhaul link channel estimation operation of the present invention.

The RB pair 1 shown in FIG. 14 exemplarily illustrates how power boosting is applied to a first slot in which the DL grant is transmitted over the R-PDCCH. The RB pair 2 shown in FIG. 14 exemplarily illustrates that no power boosting is applied when data is transmitted over a PDSCH in each of the first and second slots, and constant transmission power is allocated to the first slot and the second slot.

For example, as can be seen from the RB pair 1 of FIG. 14, if power boosting is applied to the first slot in which the DL grant is transmitted over the R-PDCCH, transmission power different from a DMRS of another RB pair (e.g., RB pair 2 of FIG. 14) is allocated to the DMRS of the RB pair 1. Therefore, if it is assumed that the RB pair 1 to which power boosting is applied and the RB pair 2 to which no power boosting is applied are combined and channel estimation is then performed on the combination of the RB pair 1 and the RB pair 2, channel estimation performance may be deteriorated or an actual channel state may not be reflected in the channel estimation result. In other words, if one or more RB pairs contained in a certain RB bundle are used to transmit the R-PDCCH (thus power boosting is applied to some RB pairs to which the R-PDCCH is transmitted), it is improper to perform channel estimation using the same method as in a normal RB bundle.

In order to solve the above-mentioned problem and perform the correct channel estimation operation, when decoding the R-PDCCH irrespective of application of the RB bundle, the embodiment of the present invention can perform channel estimation on the basis of RB(s) in which the R-PDCCH is transmitted.

When decoding the R-PDCCH, the channel estimation operation on the basis of RB(s) in which the R-PDCCH is transmitted may be limited to a specific case in which an aggregation level of the R-PDCCH is equal to or less than a predetermined aggregation level. The aggregation level of the R-PDCCH may correspond to the number of CCEs used for R-PDCCH transmission. For example, if the R-PDCCH aggregation level is set to 2 or higher or is equal to or less than a specific value (for example, the aggregation level is set to 2 or is set to 2 or 4), it is assumed that the same precoding and/or the same power allocation are/is applied to RBs (a plurality of contiguous PRBs in a frequency domain) used for R-PDCCH transmission irrespective of the RB bundling definition, such that channel estimation can be performed in the corresponding RBs based on the above assumption.

Alternatively, one R-PDCCH (DL grant or UL grant) may be transmitted over a plurality of RB pairs according to the amount of resources used for R-PDCCH transmission. In this case, it is assumed that the same precoding and/or the same power allocation are/is applied to the plurality of RB pairs over which the R-PDCCH is transmitted, such that channel estimation may be performed in the corresponding RBs based on the above assumption.

Figure 15:
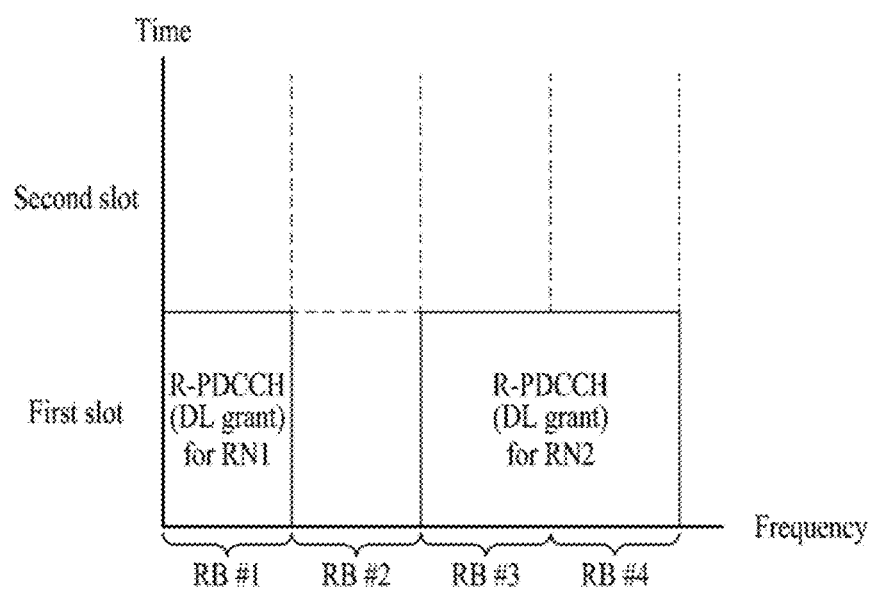
FIG. 15 is a diagram exemplarily shows the number of RB pairs to which R-PDCCH is assigned.

FIG. 15 shows one case (RN1) in which R-PDCCH is transmitted over one RB and the other case (RN2) in which R-PDCCH is transmitted over two RBs. FIG. 15 exemplarily shows four RB pairs RB#1, RB#2, RB#3 and RB#4. As can be seen from FIG. 15, in a first slot of the RB#1, a DL grant is transmitted through the R-PDCCH for a first RN (RN1). In the RB#2, no signal is transmitted. In the first slot of each of RB#3 and RB#4, the DL grant is transmitted through the R-PDCCH for a second RN (RN2).

As can be seen from the example of FIG. 15, when the first RN (RN1) decodes its own DL grant transmitted over the R-PDCCH of one RB pair, the RN1 can perform channel estimation only using one RB pair (i.e., RB#1).

In addition, as shown in the example of FIG. 15, when the second RN (RN2) decodes its own DL grant transmitted over the R-PDCCH of two RB pairs, the RN2 can perform channel estimation simultaneously using two RB pairs (RB#3 and RB#4) occupied by the R-PDCCH.

Alternatively, in order to more easily define the channel estimation operation, although the RN2 transmits the R-PDCCH over a plurality of RB pairs (RB#3 and RB#4), the RN2 may perform independent channel estimation in each of the RB pairs (RB#3 and RN#4) irrespective of the above R-PDCCH transmission. In more detail, in the case of channel estimation of the RB in which the R-PDCCH is transmitted, although several RBs are contained in the same RB bundle, the RN2 may not assume that the same precoding and/or the same power allocation are/is applied to the corresponding RBs in the RB bundle and then perform channel estimation based on the above assumption.

Channel Estimation Operation of RB Pair in which R-PDCCH is not Transmitted

A channel estimation operation in the RB pair to which no R-PDCCH is transmitted will hereinafter be described in detail.

The following description assumes that one RB bundle is comprised of three RB pairs. However, the scope of the present invention is not limited thereto and can also be applied to other examples. That is, one RB bundle may be configured with N RB pairs (where N≥2).

In accordance with one embodiment of the present invention, the R-PDCCH may be configured to always occupy one or more RB bundles. That is, R-PDCCH is configured to be transmitted over one or more RB bundles so that the R-PDCCH may not be transmitted only to some RB pairs of one RB bundle. Therefore, a channel estimation scheme for normal RB bundle can be applied to the RB pairs in which the R-PDCCH is not transmitted without any change.

In another example, R-PDCCH may be transmitted in some RB pair(s) contained in one RB bundle, and R-PDCCH may not be transmitted in the remaining RB pair(s).

Channel estimation method for this example of the present invention will be described in detail.

A detailed description of the embodiment in which a virtual RB bundle composed of one or more RB pairs in which no R-PDCCH is transmitted is configured in the RB bundle to which R-PDCCH is transmitted will be given below.

Figure 16:
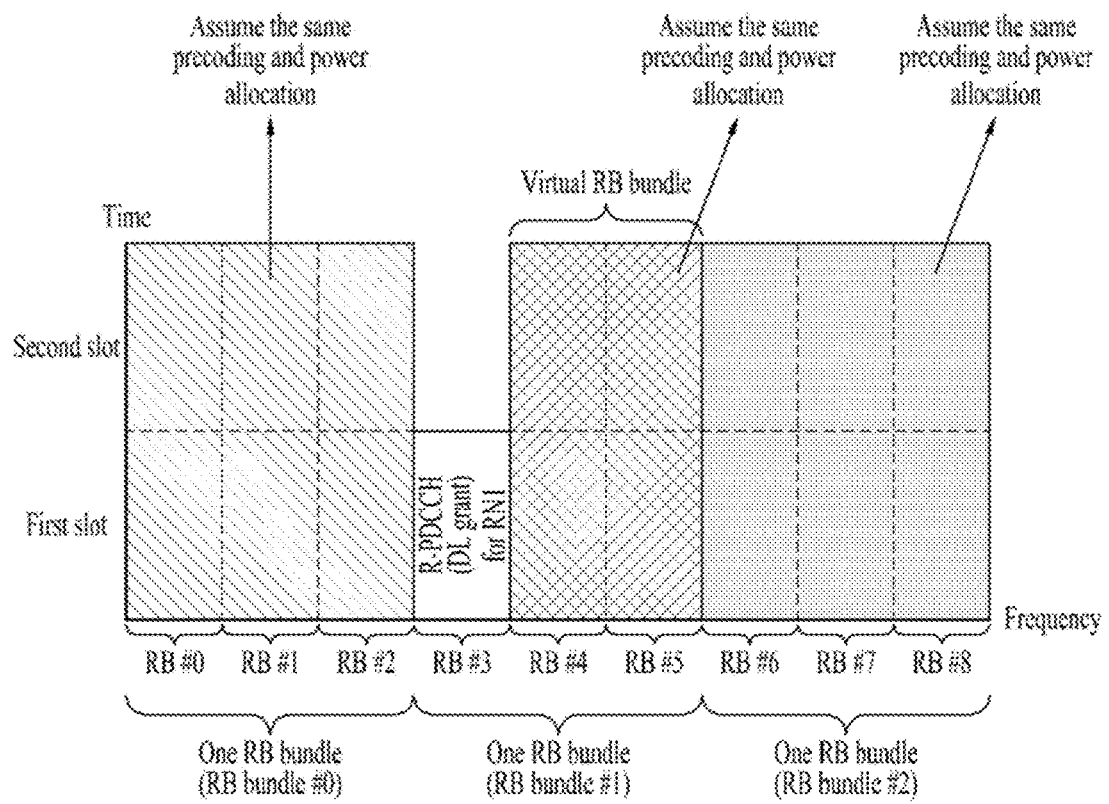
FIGS. 16 to 19 show examples in which a virtual resource block (RB) bundle is configured when some RB pair(s) of one RB bundle transmit R-PDCCH.

FIG. 16 shows an exemplary case in which R-PDCCH is transmitted in some RB pairs of one RB bundle. For example, as shown in the resource allocation scheme of FIG. 16, it can be assumed that R-PDCCH is transmitted only in one RB pair (RB#3) contained in one RB bundle (RB bundle #1) composed of three RB pairs (RB#3, RB#4 and RB#5). Under this condition, it may be assumed that the same precoding and/or the same power allocation are/is applied only to the remaining RB pairs other than an RB pair in which R-PDCCH (or DL grant) is decoded within one RB bundle, such that channel estimation may then be performed based on the above assumption. In other words, as can be seen from FIG. 16, three RB pairs consist one RB bundle, and one virtual RB bundle may be configured with the remaining RB pairs (RB#4 and RB#5) other than the RB pair (RB#3) that transmits R-PDCCH within the RB bundle (RB bundle #1) including R-PDCCH. Therefore, it is assumed that the same precoding and/or the same power allocation are applied on the basis of a virtual RB bundle, and the channel estimation operation may then be performed based on this assumption. The channel estimation method for a normal RB bundle may be applied to the remaining RB bundles (RB bundle #0 and RB bundle #2) without any change.

One embodiment in which one or more RB pairs in which no R-PDCCH is transmitted within the RB bundle in which R-PDCCH is transmitted and a contiguous RB bundle constitute the virtual RB bundle will hereinafter be described with reference to FIG. 17.

Figure 17:
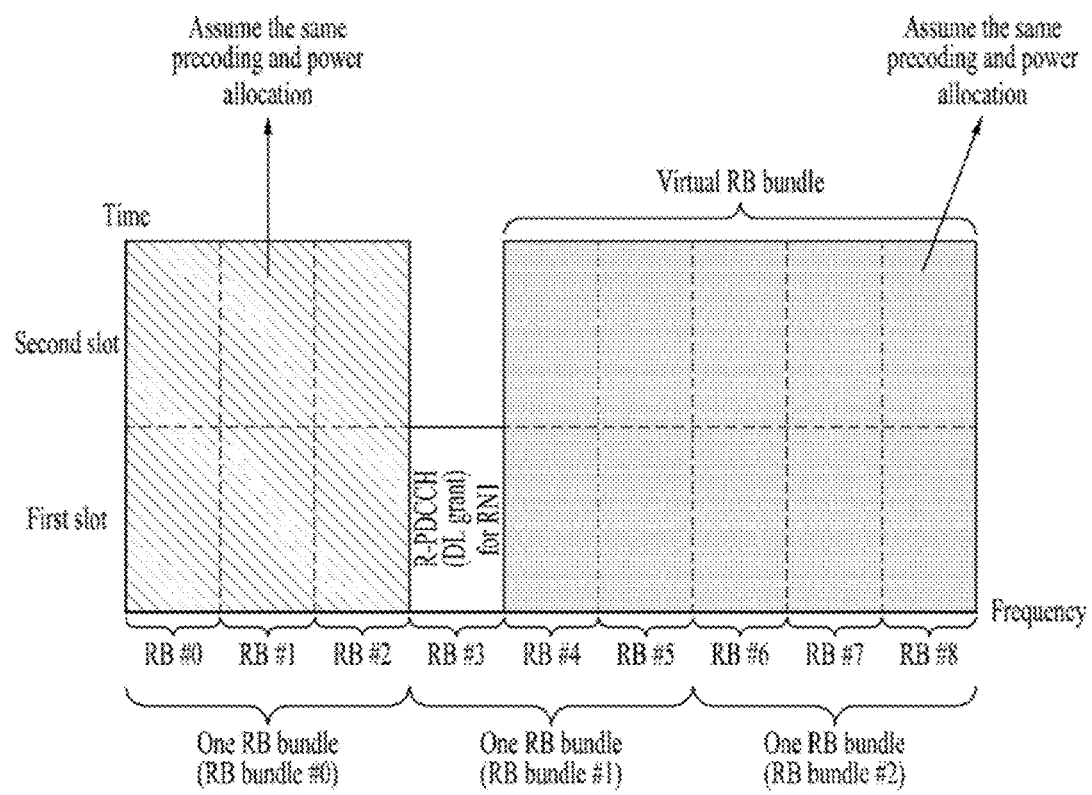

FIG. 17 shows an exemplary case in which the R-PDCCH is transmitted in some RB pairs of one RB bundle. For example, as shown in the resource allocation of FIG. 17, it can be assumed that R-PDCCH is transmitted only in one RB pair (RB#3) contained in one RB bundle (RB bundle #1) composed of three RB pairs (RB#3, RB#4 and RB#5). In this case, at least one RB pair that does not transmit the R-PDCCH within the RB bundle including the R-PDCCH may be incorporated into a contiguous RB bundle. Under the resource allocation condition of FIG. 17, in the RB bundle (RB bundle #1) including the R-PDCCH, RB pairs (RB#4 and RB5) not transmitting the R-PDCCH are incorporated into a contiguous RB bundle (e.g., RB bundle #2), so that a total of five RB pairs (RB#4 to RB#8) may constitute one virtual RB bundle. As a result, it is assumed that the same precoding and/or the same power allocation are/is applied in units of a virtual RB bundle, and the channel estimation operation may then be performed based on this assumption. The channel estimation method for a normal RB bundle may be applied to the remaining RB bundle (RB bundle #0) without change.

Another embodiment in which one or more RB pairs in which no R-PDCCH is transmitted within the RB bundle in which R-PDCCH is transmitted and a contiguous RB bundle constitute the virtual RB bundle will hereinafter be described with reference to FIG. 18.

Figure 18:
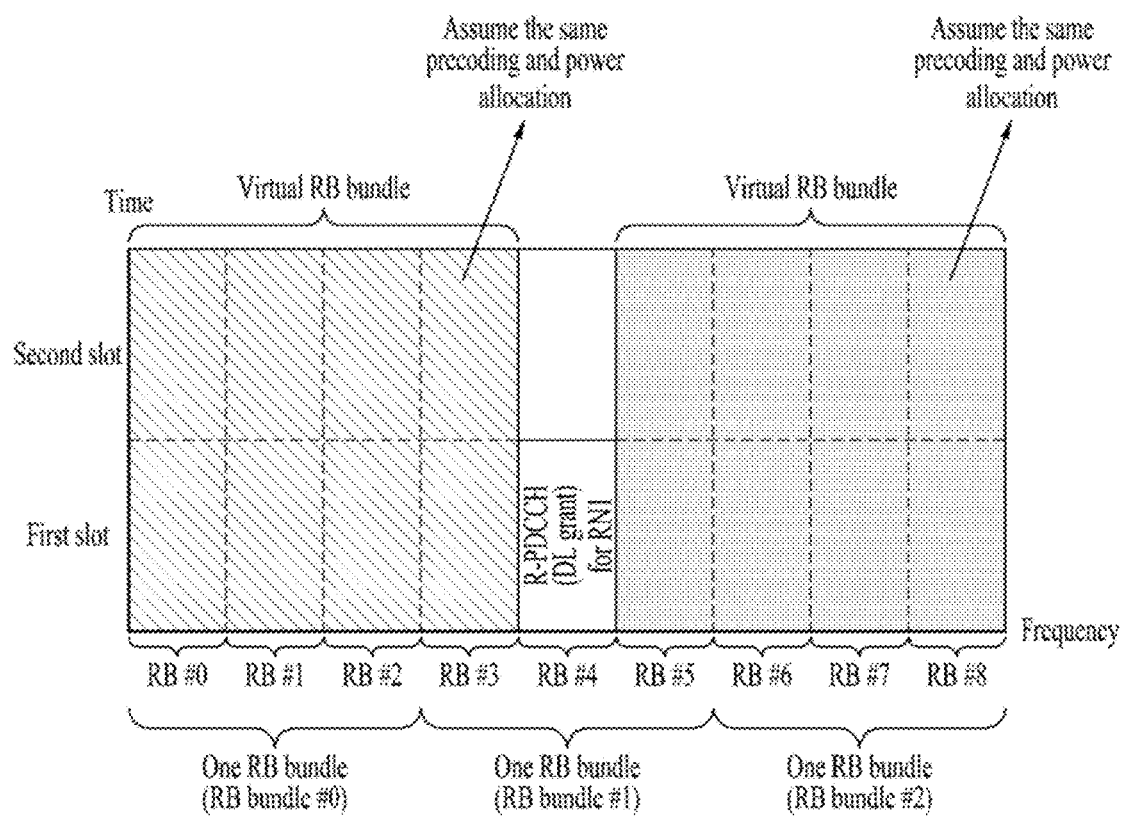

Differently from R-PDCCH transmission for use in the RB pair (RB#3) of FIG. 17, FIG. 18 shows exemplary resource allocation in which the R-PDCCH is transmitted in another RB pair (RB#4). In this case, in the RB bundle (RB bundle #1) including R-PDCCH, RB pairs (RB#3 and RB#5) not transmitting the R-PDCCH are contiguous with different RB bundles. That is, RB#3 is contiguous to the RB bundle #0, and RB#5 is contiguous to the RB bundle #2. In this case, RB#4 is incorporated into the contiguous RB bundle (RB bundle #0) so that one virtual RB bundle is constituted. RB#5 is incorporated into the contiguous RB bundle (RB bundle #2) so that another virtual RB bundle is constituted. Therefore, it is assumed that the same precoding and/or the same power allocation are/is applied in units of a virtual RB bundle, so that channel estimation can be performed based on the above assumption.

The embodiment in which the RB bundle is reconfigured on the basis of the RB pair(s) in which R-PDCCH is transmitted according to the present invention will hereinafter be described with reference to FIG. 19.

Figure 19:
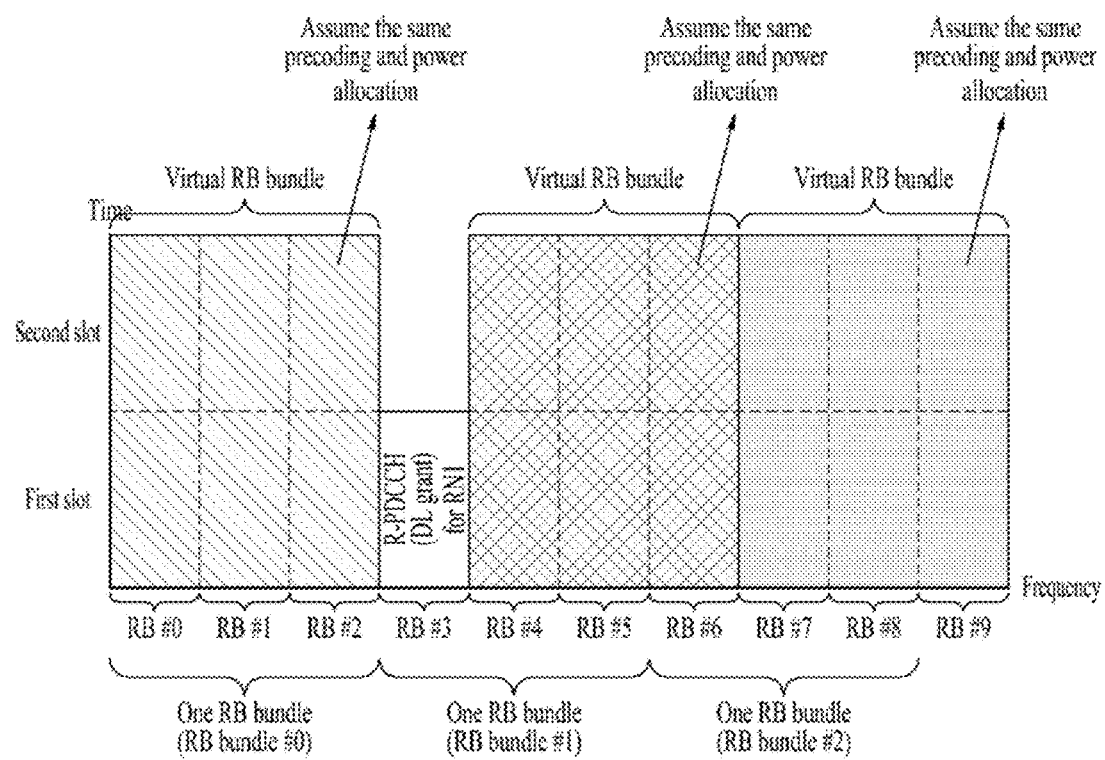

Referring to exemplary resource allocation shown in FIG. 19, RB pairs (RB#0 to RB#2) constitute one RB bundle #0, RB pairs (RB#3 to RB#5) constitute one RB bundle #1, and RB pairs (RB#6 to RB#8) constitute one RB bundle #2. For example, it is assumed that R-PDCCH is transmitted in RB#3. Therefore, in association with the RB bundle #1 in which some RB pairs transmit the R-PDCCH, it may be improper to perform channel estimation based on the assumption that the same precoding and/or the same power allocation are/is applied to the RB bundle #1. In this case, one virtual RB bundle is composed of a predetermined number of RB pairs contiguous to both directions (low frequency direction and high frequency direction in the example of FIG. 19) of the RB pair in which R-PDCCH (or DL grant) is decoded and channel estimation may be performed using the virtual RB bundle. In other words, it can be recognized that RB bundles may be reconfigured on the basis of the RB pair in which R-PDCCH (or DL grant) is decoded. For example, according to resource allocation shown in FIG. 19, one virtual RB bundle may be composed of three RB pairs (RB#4, RB#5 and RB#6) in a high frequency direction on the basis of RB#3 in which R-PDCCH (or DL grant) is decoded, and another virtual RB bundle may be composed of three subsequent RB pairs (RB#7, RB#8 and RB#9). On the other hand, one virtual RB bundle may be composed of three RB pairs (RB#0, RB#1 and RB#3) in a low frequency direction on the basis of RB#3 in which R-PDCCH is transmitted. According to the aforementioned embodiment of the present invention, virtual RB bundles that are identical to or different from the configured RB bundles (RB bundle #0, RB bundle #1, RB bundle #2, etc.) according to the position of the RB pair in which R-PDCCH is transmitted. RB bundles for all RB pairs are newly decided by repeating the process for constituting the virtual RB bundle (i.e., the process for reconfiguration RB bundles), and it is assumed that the same precoding and/or the same power allocation are/is applied to one reconfigured RB bundle, so that channel estimation can be performed based on this assumption.

Channel Estimation Application for Virtual RB Bundle

In embodiments of the present invention, according to various references, channel estimation for the aforementioned virtual RB bundle may be performed, or channel estimation may be performed on the basis of a conventional RB bundle (or an RB bundle for PDSCH).

In accordance with the channel estimation scheme for the aforementioned virtual RB bundle, in the case where R-PDCCH is allocated to a specific RB pair, an RB bundle is composed of the remaining RB pairs other than the specific RB pair (i.e., a virtual RB bundle is composed), and channel estimation can be performed based on the assumption that the same precoder is applied to the virtual RB bundle. In accordance with the channel estimation scheme in units of the conventional RB bundle, the RN assumes that the same precoder is applied to the RB bundle including RB pairs (i.e., RB pairs in which R-PDCCH or PSDCH is allocated irrespective of channel categories) in which an RN signal is allocated, such that channel estimation is performed based on this assumption. For this operation, in the case where a PDSCH is allocated to a certain RB pair (irrespective of which channel is allocated to this RB pair), the eNB may apply the same precoder to an RB bundle including this RB pair.

A variety of embodiments indicating whether channel estimation is applied to a virtual RB bundle will hereinafter be described in detail.

Figure 20:
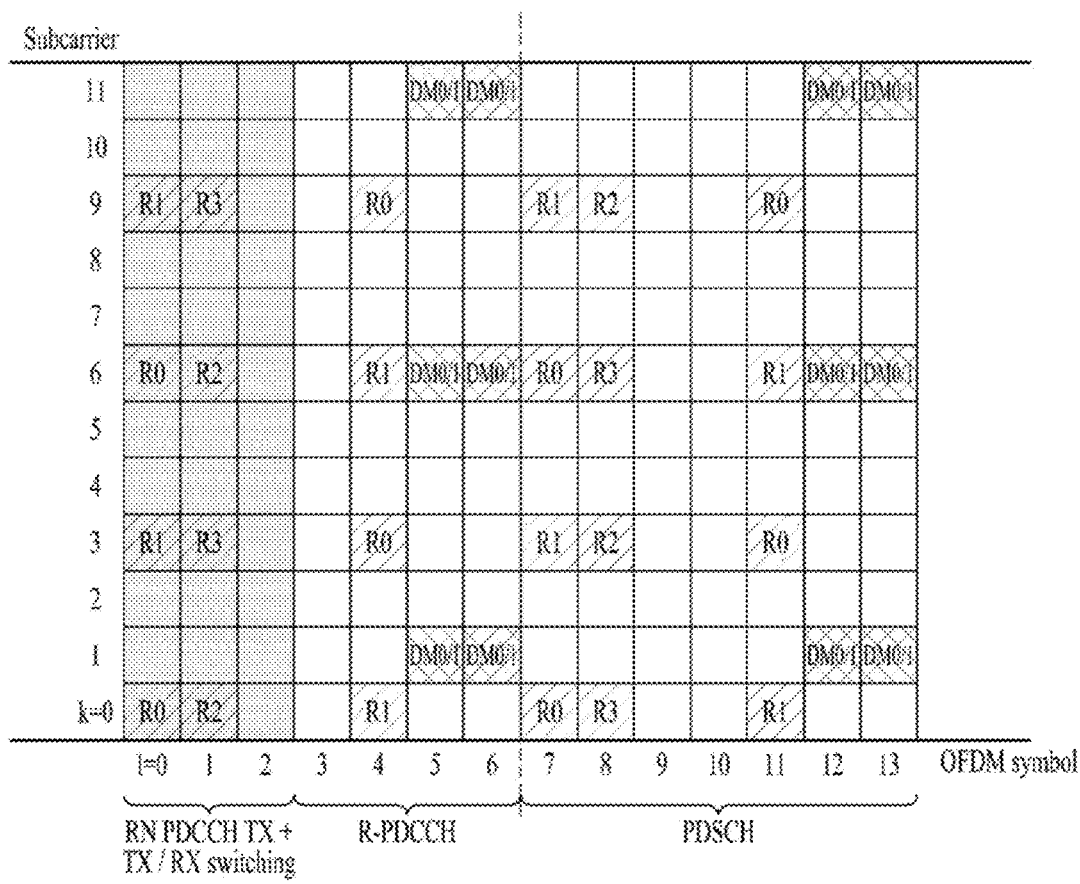
FIGS. 20 and 21 show examples in which a DMRS pattern dependent upon a rank is considered.
Figure 21:
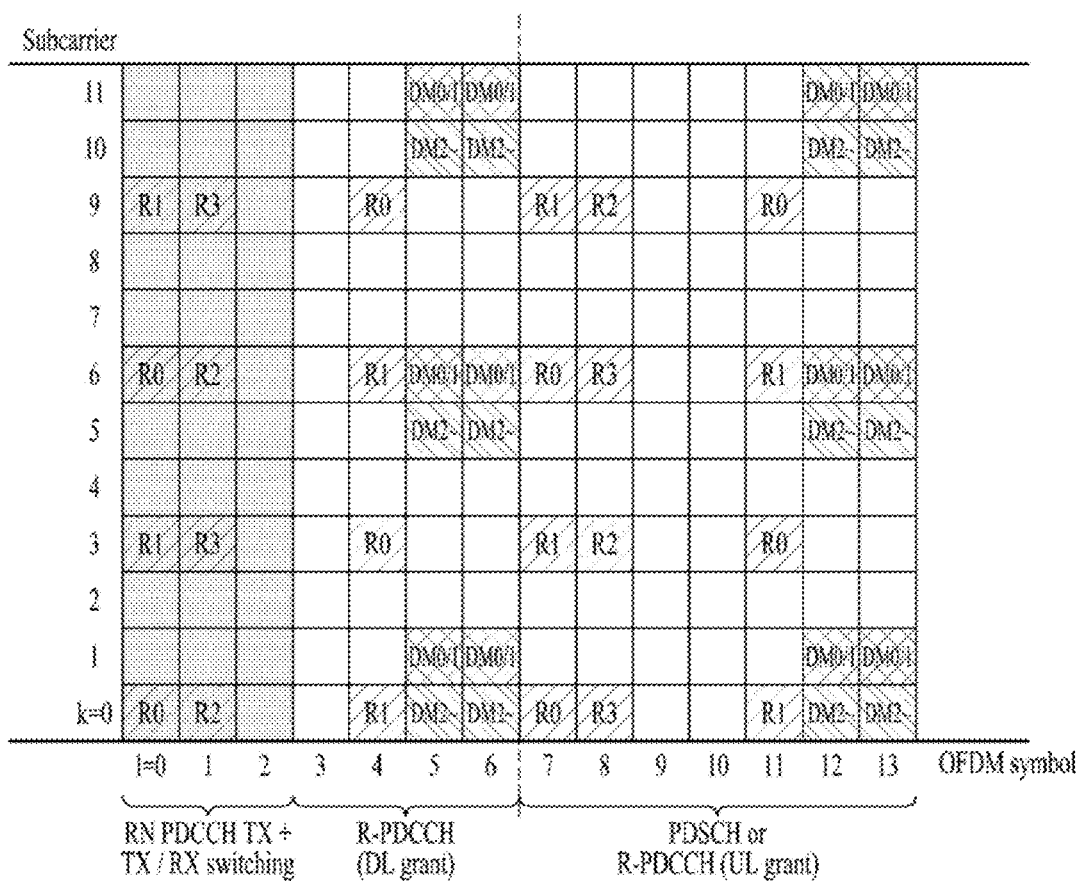

FIGS. 20 and 21 illustrate DMRS patterns, each of which is dependent upon rank.

In FIGS. 20 and 21, the first three OFDM symbols (l=0, 1 and 2) show a duration in which the RN transmits a PDCCH to a Relay-UE and another duration in which the RN is switched from a transmission operation to a reception operation (see non-hearing interval 1121 of FIG. 11). FIG. 20 shows an exemplary DMRS pattern in case of Rank 1 or Rank 2, and FIG. 21 shows an exemplary DMRS pattern in case of Rank 3 or higher.

As shown in FIG. 20, in the case of Rank 1, only a DMRS (i.e., DMRS port 0) for a layer index 0 is transmitted. In the case of Rank 2, DMRSs (i.e., DMRS ports 0 and 1) for layer indexes 0 and 1 are transmitted. DMRSs for individual layers may be multiplexed at the same RE position according to the CDM scheme. In the case of Rank 1 or Rank 2, DMRS overhead is 12 REs within one RB pair. On the other hand, in the case of Rank 3 shown in FIG. 21, DMRSs (i.e., DMRS ports 0, 1, and 2) for layer indexes 0, 1 and 2 are transmitted. In the case of Rank 3 or higher, layer indexes 0, 1, 2, . . . , 7 (i.e., DMRS ports 0, 1, 2, . . . , 7) are transmitted. In the case of each of Ranks 3 to 8, DMRS overhead is 24 REs within one RB pair. In other words, DMRS overhead for use in one RB pair is 12 REs in case of Rank 1 and Rank 2, and is 24 REs in case of Ranks 3 to 8.

On the other hand, channel estimation based on DMRS may be performed for each layer with the corresponding DMRS port. That is, individual layers may correspond to different space resources, and individual space resources have different channel states, such that DMRS may be provided to individual layers (or individual antenna ports) so as to perform channel estimation of the corresponding space channel. For example, channel estimation using DMRS for the DMRS port 0 may be the channel estimation result of a channel transmitted on the corresponding layer 0. Although the above-mentioned example has described antenna port indexes 0 to 7 for DMRS, antenna port indexes for DMRS may be represented by antenna port indexes 7 to 14 in such a manner that the above-mentioned antenna port indexes can be distinguished from conventional antenna ports (e.g., antenna ports 0 to 3 for CRS) for other RSs.

In accordance with one embodiment of the present invention, a method for constituting a virtual RB bundle according to various examples of the present invention may be applied only to channel estimation of a DMRS port of a specific rank or higher.

If a transmission rank of R-PDCCH is limited to Rank 1 or Rank 2, only DMRSs of a maximum of two ports (DMRS ports 0 and 1) need to be transmitted in an RB pair in which R-PDCCH (or DL grant) is transmitted, and signals of DMRS ports (DMRS ports 2 to 7) corresponding to Ranks higher than Rank 1 or Rank 2 need not be transmitted. For example, in the case where data of Rank 3 or higher is not multiplexed in an RB pair in which R-PDCCH is transmitted, DMRS may be transmitted only in DMRS ports 0 and 1 of the corresponding RB pair. For example, in a certain RB pair such as the DMRS pattern of FIG. 20, in the case where an R-PDCCH (or DL grant) limited to Rank 2 is transmitted in a first slot and a PDSCH less than Rank 2 is transmitted in a second slot (or in the case where an R-PDCCH limited to Rank 2 is transmitted in the second slot or no signal is transmitted in the second slot), only DMRSs through DMRS ports 0 and 1 can be transmitted in the corresponding RB pair as shown in FIG. 20.

In this case, in the RB bundle including RB pairs in which R-PDCCH limited to Rank 2 is transmitted, channel estimation for layers (i.e., DMRS port 0 or 1) used in R-PDCCH transmission may be performed on the basis of a conventional RB bundle (or an RB bundle for PDSCH). For example, in the case where R-PDCCH is transmitted in the RB pair (RB#3) as shown in FIG. 16, in relation to Rank 1 and Rank 2 (i.e., in relation to Layers 0 and 1), although an RB pair in which R-PDCCH is transmitted is present in the RB bundle, it is assumed that the same precoding and/or the same power allocation are/is applied to all RB pairs (RB#3, RB#4 and RB#5) of the RB bundle #1, such that channel estimation can be performed based on this assumption. In other words, according to the present invention, in association with the RB bundle including RB pairs in which R-PDCCH is transmitted, channel estimation for the layer(s) used for R-PDCCH transmission may be performed on the basis of the conventional RB bundle (or the RB bundle for PDSCH), instead of constituting the virtual RB bundle shown in FIG. 16.

In addition, it is assumed that, in a certain RB pair of an RB bundle including RB pair(s) in which R-PDCCH limited to Rank 2 is transmitted, a PDSCH is transmitted with a transmission rank (e.g., Rank 3) higher than the transmission rank of the R-PDCCH. In this case, in an RB pair in which the R-PDCCH limited to Rank 2 is transmitted, DMRS for Layer 0 or 1 may be transmitted in the RB pair, but DMRSs for Layers 2 to 7 may not be transmitted in the RB pair. Therefore, for the remaining layers (Layers 2, 3, . . . 7) other than Layers 0 and 1 in association with transmission of Rank 3 or higher, it is preferable that the virtual RB bundles shown in one of FIGS. 16 to 19 are applied to the remaining layers and channel estimation is then performed.

For example, in the case of resource allocation in which R-PDCCH is transmitted in the RB pair (RB#3) as shown in FIG. 16, channel estimation for the DMRS ports 0 and 1 may be performed on the assumption that the same precoding and/or the same power allocation are/is applied to RB pairs (RB#3 to RB#5) (i.e., on the basis of a conventional RB bundle). On the other hand, channel estimation for DMRS ports 2 to 7 may be performed on the assumption that the same precoding and/or the same power allocation are/is applied only to a virtual RB bundle composed of only RB#4 and RB#5 other than RB#3. Alternatively, in order to perform channel estimation for DMRS ports 2 to 7, the virtual RB bundle may be configured in the same manner as in one of FIGS. 16 to 19.

On the other hand, according to the another examples of the present invention, application of the method for constituting a virtual RB bundle may be determined according to the number of DMRS ports assumed when R-PDCCH is decoded in the first slot.

For example, in the case where R-PDCCH is decoded on the assumption that a maximum of 2 DMRS ports are used in a first slot of a certain RB pair as shown in FIG. 20, DMRSs for layers 2 to 7 may not be transmitted in the corresponding RB pair. In this case, the RB pair in which R-PDCCH (or DL grant) is transmitted is not incorporated into the RB bundle for a PDSCH, and a virtual RB bundle as shown in one of FIGS. 16 to 19 is constituted such that channel estimation can be performed.

In the case where R-PDCCH is decoded in a first slot of a certain RB pair on the assumption of three or more DMRS ports as shown in FIG. 21, DMRSs for all layers can be transmitted in the corresponding RB pair. In this case, an RB pair in which R-PDCCH (or DL grant) is transmitted is incorporated into the RB bundle for PDSCH in such a manner that channel estimation can be performed in units of a conventional RB bundle.

In FIGS. 20 and 21, the number of DMRS ports transmitted in the second slot may be changed according to a rank value of a signal transmitted in the corresponding position. In case of PDSCH, the rank value may be indicated by the DL grant. In case of R-PDCCH, the rank value may be predetermined or may be decided according to the number of DMRSs.

On the other hand, according to yet another example of the present invention, application of the method for constituting a virtual RB bundle may be decided according to usage of the second slot under the condition that R-PDCCH (or DL grant) is detected in the first slot of a certain RB pair.

For example, assuming that a PDSCH is transmitted in a second slot of an RB pair in which R-PDCCH (or DL grant) is transmitted in a first slot, this means that the R-PDCCH and the PDSCH share DMRSs transmitted over two slots. Therefore, the RB pair in which PDSCH is transmitted in a second slot is incorporated into a conventional RB bundle (or RB bundle for a PDSCH) although R-PDCCH (or DL grant) is transmitted in the first slot, such that channel estimation can be performed on the assumption of the same precoding and/or the same power allocation as in the conventional RB bundle (i.e., RB pairs contiguous to the corresponding RB pair). That is, if PDSCH is allocated to the second slot of a certain RB pair, channel estimation can be performed on the assumption of the same precoding and/or the same power allocation on the basis of an RB bundle for a PDSCH, irrespective of whether R-PDCCH (or DL grant) is transmitted in the first slot. In other words, it is assumed that the same precoding is applied to all RB pairs to which PDSCH is allocated, so that channel estimation can be performed on this assumption.

On the other hand, assuming that PDSCH is not transmitted in a second slot of the RB pair in which R-PDCCH (or DL grant) is transmitted in a first slot (for example, assuming that a UL grant or no signal is transmitted in the second slot), this means that the R-PDCCH and the PDSCH do not share a DMRS transmitted over two slots. In this case, it is not assumed that the same precoding and/or the same power allocation are/is allocated to R-PDCCH and PDSCH. Therefore, the RB pair in which R-PDCCH (or DL grant) is transmitted is not incorporated into the RB bundle for a PDSCH, such that channel estimation can be performed using the virtual RB bundle shown in one of FIGS. 16 to 19.

In other words, according to the above-mentioned description, the RN uses an RB bundle composed of only RB pairs in which PDSCH is transmitted, and channel estimation is performed on the assumption that the same precoding and the same power allocation are used in the corresponding RB bundle.

Channel Estimation Dependent Upon SCID Setting

A scrambling identify (SCID) may be applied to create a DMRS sequence. The SCID used in DMRS sequence creation may be indicated to a receiver through a DCI format configured to schedule DL transmission. For example, SCID may be set to 0 or 1 and may be differently assigned to individual antenna ports so as to distinguish antenna ports.

Figure 22:
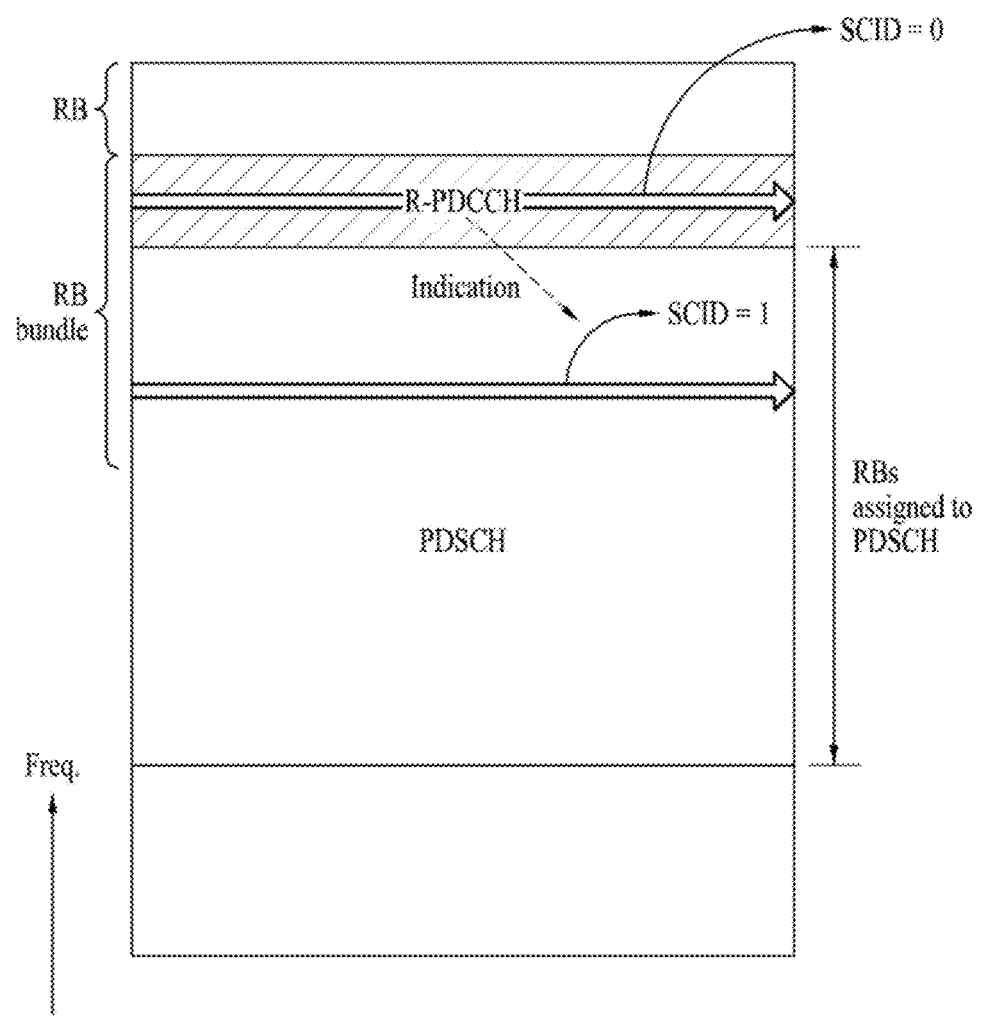
FIG. 22 shows examples in which a scrambling ID used in one RB bundle is considered.

In a backhaul downlink from the eNB to the RN, the same SCID may be assigned to R-PDCCH and PDSCH, or different SCIDs may be assigned to R-PDCCH and PDSCH. In more detail, while the same SCID may be assigned to DMRSs transmitted in the R-PDCCH region and DMRSs transmitted in the PDSCH region, it should be noted that different SCIDs may be assigned thereto. For example, although R-PDCCH and PDSCH are transmitted through the same antenna port index (e.g., antenna port index 7), SCID used for the R-PDCCH is fixed to zero (0) and SCID used for PDSCH may be indicated by 'SCID=1' through control information in the R-PDCCH. In this case, R-PDCCH and PDSCH may be transmitted in the same RB bundle as shown in FIG. 22, and may be assigned different SCIDs. Detailed examples of the channel estimation operation according to the above-mentioned embodiments of the present invention will hereinafter be described in detail.

In accordance with one example of the present invention, it is assumed that the same precoding and/or the same power allocation are/is applied to R-PDCCH and PDSCH having different SCIDs, and channel estimation can be performed on this assumption. That is, although the SCID assigned to the R-PDCCH is different from SCID assigned to the PDSCH, the same power allocation and/or the same precoding are/is applied to signals transmitted through the same antenna port within the same RB bundle. Accordingly, the RN can perform channel estimation for one RB bundle using more DMRSs (i.e., DMRSs for the R-PDCCH region and DMRSs for the PDSCH region), such that channel estimation performance can be improved.

According to another example of the present invention, in the case where different SCIDs are assigned to R-PDCCH and PDSCH, channel estimation can be performed in the RB bundle other than an RB pair including the R-PDCCH. In more detail, although signals are transmitted through the same antenna port within the same RB bundle, if the signals have different SCIDs, this means that it is improper to apply the assumption of the same precoding and/or the same power allocation. If it is assumed that channel estimation is performed as described above, channel estimation performance is lower than that of the above-mentioned example (assuming different SCIDs and the same power allocation and/or the same precoding), but the channel estimation operation over different SCIDs need not be used, thereby simplifying a configuration related to the receiver of the RN.

On the other hand, in the case where the SCID of the PDSCH is indicated as the same value as that of the R-PDCCH through control information in the R-PDCCH, it is assumed that the same power allocation and/or the same precoding are/is applied to the R-PDCCH and the PDSCH, and channel estimation is performed on this assumption.

Figure 23:
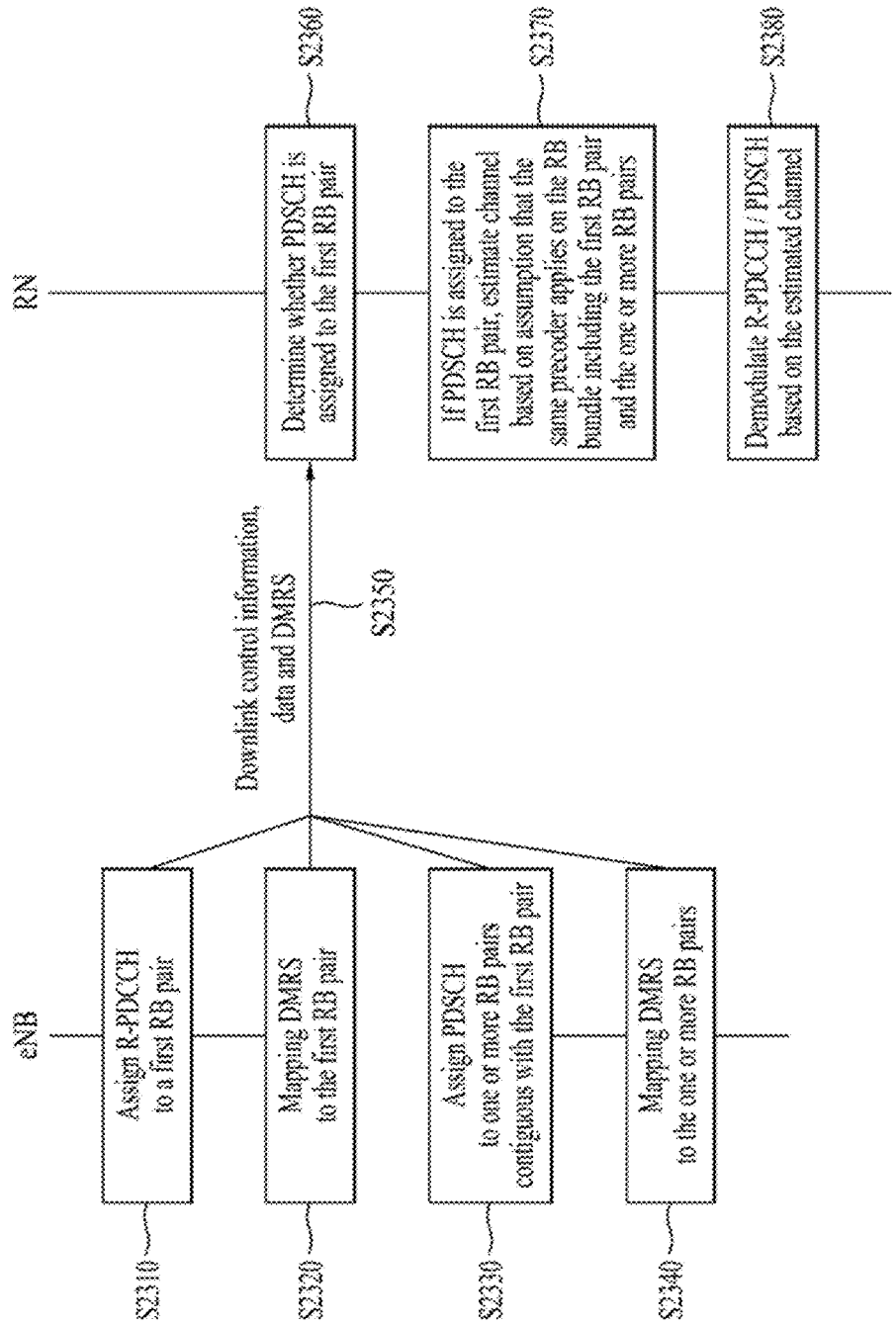
FIG. 23 is a flowchart illustrating an exemplary DL channel estimation operation of a relay node (RN).

FIG. 23 is a flowchart illustrating an exemplary DL channel estimation operation of a relay node (RN).

The overall operations of the eNB and the RN will hereinafter be described with reference to FIG. 23. Steps S2310 to S2340 shown in FIG. 23 are performed by the eNB. In more detail, the eNB assigns an R-PDCCH for transmitting DL control information to DL resources, assigns a PDSCH for transmitting DL data to DL resources, and maps DMRSs to DL resources. One or more of the steps S2310 to S2340 may be simultaneously performed. DL control information, DL data and DMRSs, that are assigned and/or mapped to DL resources in steps S2310 to S2340, are transmitted to the RN, such that the RN can receive the control information, the DL data, and the DMRSs. According to whether a PDSCH is allocated to a specific RB pair to which R-PDCCH is allocated in DL resources, the RN may perform channel estimation using DMRSs of an RB bundle used as a unit of DL channel estimation, and demodulate and decode DL control information and DL data on the basis of the estimated channel. Individual operations shown in FIG. 23 will hereinafter be described in detail.

In step S2310, the eNB may include an R-PDCCH in one RB pair (first RB pair). For example, R-PDCCH may include DL grant control information. R-PDCCH may be assigned to a first slot of the first RB pair. In addition, PDSCH may be assigned to a second slot of the first RB pair, or R-PDCCH transmitting UL grant control information may be assigned to the second slot of the first RB pair. Alternatively, no signal (i.e., a null signal) may be assigned to the second slot of the first RB pair.

The eNB may map DMRSs to the first RB pair in step S2320. The DMRS may be mapped to the first RB pair according to a DMRS pattern dependent upon the number of layers (i.e., ranks) in which R-PDCCH and/or PDSCH assigned to the first RB pair are/is transmitted.

In step S2330, the eNB may assign a PDSCH to one or more RB pairs contiguous to the first RB pair. In step S2340, the eNB may map DMRSs to one or more RB pairs to which PDSCH is assigned at step S2330. The DMRSs may be mapped to each RB pair according to a DMRS pattern dependent upon the number of layers (i.e., ranks) in which PDSCH assigned to the one or more RB pairs is transmitted.

In step S2350, the eNB transmits DL control information, DL data, and/or DMRSs to the RN, such that the RN can receive those from the eNB. The DL control information, the DL data and/or the DMRSs transmitted in the first RB pair and one or more RB pairs contiguous to the first RB pair can be transmitted in the same time unit (e.g., one subframe).

In step S2360, in order to determine an RB bundle for channel estimation, the RN may determine whether a PDSCH is assigned to the first RB pair to which a DL grant R-PDCCH is assigned. Since channel estimation can be performed on the assumption that the same precoder is applied to the RB bundle, it is necessary to determine which RB pair is contained in one RB bundle. In other words, the RN according to the present invention may determine an RB bundle for channel estimation by determining whether a PDSCH is assigned to the first RB pair in which R-PDCCH is assigned.

If the RN determines that the PDSCH is assigned to the first RB pair to which the R-PDCCH is assigned in step S2360, the RN determines RB pairs (i.e., the first RB pair and one or more RB pairs contiguous to the first RB pair) to which the PDSCH is assigned to be one RB bundle, and performs channel estimation on the assumption that the same precoder is applied to the corresponding RB bundle in step S2370. Channel estimation can be performed using all DMRSs transmitted in the corresponding RB bundle.

For example, the RB bundle including the first RB pair may be applied to channel estimation of each of the one or more layers (e.g., layer indexes 0 and 1) used for transmitting the R-PDCCH assigned to the first RB pair. On the other hand, for channel estimation upon individual layers (e.g., layer indexes 2 to 7) that are not used for transmitting the R-PDCCH assigned to the first RB pair, but used for transmitting the PDSCH assigned to one or more RB pairs contiguous to the first RB pair, the RB bundle including RB pairs other than the first RB pair may be used as a channel estimation unit.

Alternatively, the RB bundle including the first RB pair may be applied to estimate a DL channel under the condition that the number of DL layers assumed for decoding the R-PDCCH assigned to the first RB pair is at least a predetermined number (e.g., 3). On the other hand, if the number of DL layers is less than the predetermined number, the RB bundle including the RB pairs other than the first RB pair may be used as a channel estimation unit.

If it is determined that the PDSCH is not assigned to the first RB pair to which the R-PDCCH is assigned in step S2360, the RB bundle including RB pairs other than the first RB pair to which the R-PDCCH is assigned is decided, and channel estimation can be performed on the assumption that the same precoder is applied to the corresponding RB bundle. The channel estimation may be performed using all DMRSs transmitted in the corresponding RB bundle.

In step S2380, the RN demodulates R-PDCCH and/or PDSCH on the basis of the estimated channel of the step S2370, and it can receive DL control information and/or DL data.

In FIG. 23, in association with the method for estimating a DL channel of the RN, details described in the above-mentioned various embodiments may be applied independently, or two or more embodiments may be simultaneously applied. Redundant matters will not be described herein for clarity.

In addition, although the above-mentioned various embodiments of the present invention have disclosed MIMO transmission between the eNB and the RN, the scope of the present invention is not limited thereto, and it is obvious to those skilled in the art that the principle proposed in the present invention can also be applied to any DL transmission entity (eNB or RN) and any DL reception entity (UE or RN) without departing from the scope of the invention. For example, proposed principle related to DL transmission from the eNB to the RN may also be equally applied to other types of DL transmission from the eNB to the UE or from the RN to the UE. For example, proposed principle related to DL reception by the RN from the eNB may also be equally applied to other types of DL reception by UE from the eNB or by UE from the RN. In more detail, in the case where a DL reception entity demodulates a control channel (e.g., an advanced PDCCH) for the corresponding DL reception entity using a DL channel estimated by DMRSs within a certain RB pair, and receives control information, the above-mentioned embodiment can establish an RB bundle assuming the application of the same precoder, and the principles of the present invention can also be applied to the above-mentioned embodiment.

Figure 24:
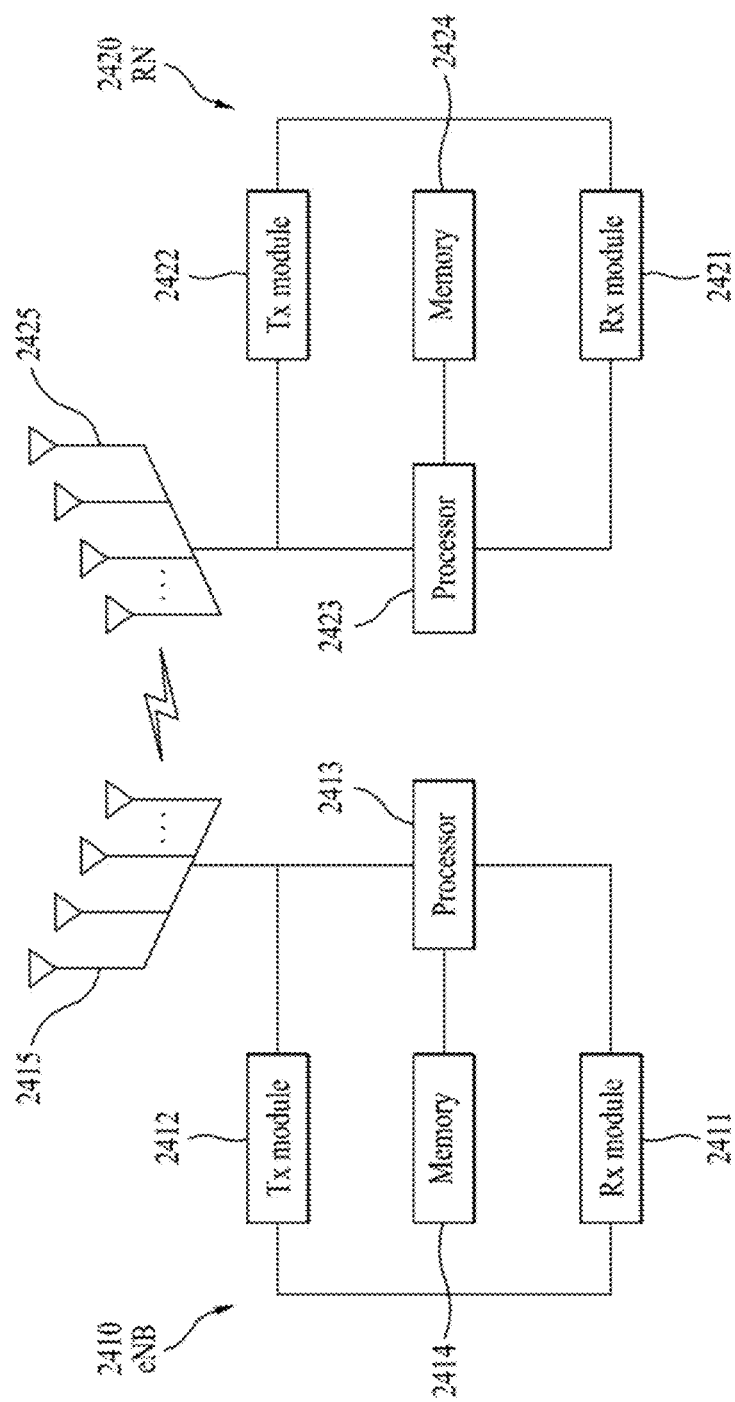
FIG. 24 is a block diagram illustrating an eNB and a relay node (RN) according to embodiments of the present invention.

FIG. 24 is a block diagram of an eNB apparatus and an RN apparatus according to an embodiment of the present invention.

Referring to FIG. 24, an eNB apparatus 2410 may include an Rx module 2411, a Tx module 1212, a processor 2413, a memory 2414, and a plurality of antennas 2415. The plurality of antennas 2415 supports MIMO transmission and reception. The reception (Rx) module 2411 may receive a variety of signals, data and information on an uplink starting from either the UE or the RN. The Tx module 2412 may transmit a variety of signals, data and information on a downlink for the UE or the RN. The processor 2413 may provide overall control to the eNB apparatus 1410.

The eNB apparatus 2410 according to one embodiment of the present invention may be configured to transmit a DL signal for the RN. The processor 2413 of the eNB may be configured to transmit DL control information through an R-PDCCH within a first RB pair through the Tx module

2412, and may also be configured to transmit a demodulation reference signal (DMRS) used for estimating a DL channel used for demodulating the R-PDCCH. In addition, through the Tx module 2412, the processor 2413 may be configured to transmit DL data through a PDSCH within one or more RB pairs contiguous to the first RB pair, and may also be configured to transmit a DMRS used for estimating a DL channel used for demodulating the PDSCH. In addition, in the case where the PDSCH is assigned to the first RB pair, the processor 2413 may apply the same precoder to one RB bundle including one or more RB pairs contiguous to the first RB pair.

Besides, the processor 2413 processes information received at the eNB apparatus 2410 and transmission information. The memory 2414 may store the processed information for a predetermined time. The memory 2414 may be replaced with a component such as a buffer (not shown).

The RN apparatus 2420 may include an Rx module 2421, a Tx module 2422, a processor 2423, a memory 2424, and a plurality of antennas 2425. The plurality of antennas 2425 indicates an RN for supporting MIMO transmission and reception. The Rx module 2421 may include a first Rx module and a second Rx module. The first Rx module may receive downlink signals, data and information from the eNB. The second Rx module may receive uplink signals, data and information from the UE. The Tx module 2422 may include a first Tx module and a second Tx module. The first Tx module may transmit uplink signals, data and information to an eNB. The second Tx module may transmit downlink signals, data and information to the UE. The processor 2423 may provide overall control to the UE apparatus 2420.

The RN apparatus 2420 according to one embodiment of the present invention may be configured to estimate a DL channel starting from the eNB in a wireless communication system. The processor 2423 of the RN apparatus 2420 may demodulate an R-PDCCH of a first RB pair on the basis of a DL channel estimated by a DMRS of the first RB pair and receive DL control information through the first Rx module. In addition, through the first Rx module, on the basis of a DL channel estimated by a DMRS of one or more RB pairs contiguous to the first RB pair, the processor 2423 may demodulate a PDSCH of the one or more RB pairs so as to receive DL data. If the PDSCH is assigned to the first RB pair, DL channel may be estimated on the assumption that the same precoder is applied to one RB bundle including the first RB pair and the one or more RB pairs contiguous to the first RB pair.

The processor 2423 of the RN apparatus 2420 processes information received at the RN apparatus 2420 and transmission information. The memory 2424 may store the processed information for a predetermined time. The memory 2424 may be replaced with a component such as a buffer (not shown).

The specific configurations of the above eNB and RN apparatuses may be implemented such that the various embodiments of the present invention are performed independently or two or more embodiments of the present invention are performed simultaneously. Redundant matters will not be described herein for clarity.

Although FIG. 24 has exemplarily described MIMO transmission between the eNB and the RN, the same description of the eNB apparatus 2410 shown in FIG. 24 is applicable to any DL transmission entity (eNB or RN), and the same description of the RN apparatus 2420 is applicable to any DL reception entity (UE or RN). For example, the eNB apparatus configured to transmit a downlink signal to the RN shown in FIG. 24 may also be equally applied to an eNB for transmitting a downlink signal to the UE or to an RN for transmitting a downlink signal to the UE. In addition, the RN apparatus configured to receive a downlink signal from the eNB may also be equally applied to a UE for receiving a downlink signal from the eNB or to a UE for receiving a downlink signal from the RN. In more detail, when implementing the downlink reception entity that receives control information by demodulating a control channel (e.g., an advanced PDCCH) of the corresponding DL reception entity using the DL channel estimated by a DMRS within a certain RB pair, the present invention can establish the RB bundle on the assumption of the same precoder in such a manner that the principles of the present invention can be equally applied to all embodiments of the present invention.

The above-described embodiments of the present invention can be implemented by a variety of means, for example, hardware, firmware, software, or a combination of them.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software codes may be stored in a memory unit so that it can be driven by a processor. The memory unit is located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it will be obvious to those skilled in the art that claims that are not explicitly cited in the appended claims may be presented in combination as an exemplary embodiment of the present invention or included as a new claim by subsequent amendment after the application is filed.

The embodiments of the present invention are applicable to various mobile communication systems. It will be apparent to those skilled in the art that various modifications and variations can be made in the present invention without departing from the scope of the invention. Thus, it is intended that the present invention cover the modifications and variations of this invention provided they come within the scope of the appended claims and their equivalents.

What is claimed is:

1. A method for receiving a downlink signal at a downlink reception entity in a wireless communication system, the method comprising:
  receiving downlink control information by demodulating a Physical Downlink Control Channel (PDCCH) in a first resource block (RB) pair within an RB bundle by using a first Demodulation Reference Signal (DMRS); and
  receiving downlink data by demodulating a Physical Downlink Shared Channel (PDSCH) in one or more second RB pairs scheduled by the downlink control information within the RB bundle by using a second DMRS based on an assumption that a same precoder is applied to the scheduled one or more second RB pairs.

2. The method of claim 1, wherein the downlink control information includes downlink scheduling information associated with the PDSCH.

3. The method of claim 1, wherein the PDSCH is not mapped to resource elements used for the second DMRS.

4. The method of claim 1, wherein the PDSCH is not mapped to resource pairs which carry the PDCCH.

5. The method of claim 1, wherein the RB bundle includes consecutive RB pairs.

6. A downlink reception entity for performing downlink reception, the downlink reception entity comprising:
  a receiver configured to receive a downlink signal from a downlink transmission entity;
  a transmitter configured to transmit an uplink signal to the downlink transmission entity; and
  a processor configured to control the receiver and the transmitter,
  wherein the processor is further configured to:
    receive, through the receiver, downlink control information by demodulating a Physical Downlink Control Channel (PDCCH) in a first resource block (RB) pair within an RB bundle by using a first Demodulation Reference Signal (DMRS), and
    receive, through the receiver, downlink data by demodulating a Physical Downlink Shared Channel (PDSCH) in one or more second RB pairs scheduled by the downlink control information within the RB bundle by using a second DMRS based on an assumption that a same precoder is applied to the scheduled one or more second RB pairs.

* * * * *